(12) United States Patent
Saji

(10) Patent No.: US 6,742,935 B2
(45) Date of Patent: Jun. 1, 2004

(54) ROLLER BEARINGS AND CHAIN INCORPORATING THE ROLLER BEARINGS

(75) Inventor: Tomoyuki Saji, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/071,970

(22) Filed: Feb. 8, 2002

(65) Prior Publication Data

US 2002/0110297 A1 Aug. 15, 2002

(30) Foreign Application Priority Data

Feb. 9, 2001 (JP) .................................. 2001-034283

(51) Int. Cl.[7] .............................................. F16C 21/00
(52) U.S. Cl. ........................ 384/587; 384/127; 384/572
(58) Field of Search ............................. 384/127, 420, 384/469, 569, 587, 573, 572, 578, 579

(56) References Cited

U.S. PATENT DOCUMENTS

| | | | |
|---|---|---|---|
| 681,793 A | | 9/1901 | Hutchinson |
| 745,198 A | * | 11/1903 | Klahn .......................... 384/578 |
| 1,609,618 A | * | 12/1926 | Gallagher et al. ........... 384/578 |
| 2,540,283 A | * | 2/1951 | Parsons ....................... 384/578 |
| 2,696,412 A | * | 12/1954 | Blair ............................ 384/578 |
| 3,206,263 A | * | 9/1965 | Altson ......................... 384/578 |
| 3,362,762 A | | 1/1968 | Haller |
| 3,711,911 A | | 1/1973 | Schweitzer |
| 4,915,511 A | | 4/1990 | Kotegawa et al. |
| 5,660,485 A | * | 8/1997 | Podhajecki et al. .......... 384/572 |
| 5,743,659 A | * | 4/1998 | Stewart ....................... 384/573 |
| 5,823,686 A | | 10/1998 | Murano et al. |
| 6,102,573 A | | 8/2000 | Morimoto et al. |
| 6,179,474 B1 | | 1/2001 | Podhajecki |

FOREIGN PATENT DOCUMENTS

| | | |
|---|---|---|
| JP | 62-4122 | 1/1987 |
| JP | 62004122 | 1/1987 |
| JP | 2-7219 | 1/1990 |
| JP | 2-145323 | 12/1990 |
| JP | 10-250817 | 9/1998 |
| JP | 11-240072 | 3/2001 |

* cited by examiner

Primary Examiner—David A. Bucci
Assistant Examiner—Colby Hansen
(74) Attorney, Agent, or Firm—Howson and Howson

(57) ABSTRACT

A roller chain incorporating the roller bearings wherein a plurality of rollers are disposed between a roller that functions as an outer ring and a bush that functions as an inner ring comprises a substantially ring-shaped retainer disposed on both ends of the roller respectively. The retainer includes a plurality of pockets for guiding at least a part of each of the rollers on the inner side of the retainer.

10 Claims, 12 Drawing Sheets

ROLLER BEARINGS AND CHAIN INCORPORATING THE ROLLER BEARINGS

BACKGROUND OF THE INVENTION

The present invention relates to roller bearings and a roller chain incorporating the roller bearings.

Conventionally, Japanese Unexamined Patent Application, First Publication No. Sho. 62-4122 (Japanese Examined Patent Application, Second Publication No. Hei. 4-78523) discloses a roller chain incorporating the roller bearings. FIG. 22 is a cross-sectional view of the roller chain disclosed in the above-mentioned Japanese Unexamined Patent Application, First Publication No. Sho. 62-4122. In the roller chain 1 shown in FIG. 22 a plurality of rollers 4 for bearing are disposed on an outer periphery of a bush 3 whose both ends were connected to a pair of inner link plates 2, a roller 5 is attached to the rollers 4 so as to surround the rollers 4, and a thrust bearings receiving plate 6 is intervened in a space between the roller 5 and the inner link plate 2. Further, a pair of outer link plates 7 is disposed outside the inner link plates 2 and the pair of outer link plates 7 is connected to each other by means of a pin 8 that penetrates the bush 3. On the both ends of the roller 5 are integrally formed inward collars 5a, which hold and guide the rollers 4. Further, the space between the roller 5 and the bush 3 is filled with a lubricant such as grease or the like. In the roller chain 1, the roller 5 functions as an outer ring of the roller bearings, the plurality of rollers 4 function as a rolling body of the roller bearings and the bush 3 functions as an inner ring of the roller bearings. Therefore, the roller 5, the rollers 4 and the bush 3 constitute the roller bearings.

As another conventional example, Japanese Unexamined Utility Model Application, First Publication No. Hei. 2-7219 (Japanese Examined Utility Model Application, Second Publication No. Hei. 7-12327) discloses a roller chain incorporating the roller bearings. FIG. 23 is a cross-sectional view of the roller chain disclosed in the above-mentioned Japanese Unexamined Utility Model Application, First Publication No. Hei. 2-7219. In the roller chain 1' shown in FIG. 23 a plurality of rollers 4' are disposed on an outer periphery of a bush 3' whose both ends were connected to a pair of inner link plates 2', a roller 5' is attached to the rollers 4' so as to surround the rollers 4', and a thrust bearings receiving plate 6' is intervened in a space between the roller 5' and the inner link plate 2'. Further, a pair of outer link plates 7' is disposed outside the inner link plates 2' and the pair of outer link plates 7' is connected to each other by means of a pin 8' that penetrates the bush 3'. The roller 5' has not inward collars 5a on the both ends of the roller 5' but the inner and outer peripheries of the roller 5' are straight. The rollers 4' are held and guided between a pair of thrust bearings receiving plates 6'. Further, the space between the roller 5' and the bush 3' is filled with a lubricant such as grease or the like. In the roller chain 1', the roller 5' functions as an outer ring of the roller bearings, the plurality of rollers 4' function as a rolling body of the roller bearings and the bush 3' functions as an inner ring of the roller bearings. Therefore, the roller 5', the rollers 4' and the bush 3' constitute the roller bearings.

Further, conventionally the general roller bearing offers a retainer incorporating type and a retainer-unused type. The retainer that holds and guides the rollers generally has a pocket that holds and guides the whole each roller.

However, the roller chain 1 shown in FIG. 22 has the following problems. That is, (1) The rollers 4 are only accommodated between the roller (outer ring) 5 and the bush (inner ring) 3, freely, and contact is generated between the rollers 4. Accordingly, wear is generated whereby a smooth rotation of the roller 5 is suppressed.

(2) Collision noises are generated on the contact between the rollers 4, and repeated impacts can generate a fatigue fracture.

(3) When a thrust load is applied to the roller 5, a skew (the slanting of the rollers 4 with respect to the proper rotational axis) is generated, and the collar 5a rubs against the roller 4. Accordingly, the rollers 4 are locked at an early stage, resulting in suppressing a smooth rotation of the roller 5.

(4) By sliding of the inner side of the collar 5a in the both ends of the roller 5 on the end face of the roller 4 the collar 5a rubs against the roller 4, resulting in suppressing a smooth rotation of the roller 5.

(5) Since the inner side of the collar 5a is a difficult place to enhance the surface roughness and perform heat-treatment in its manufacturing, the productivity of the roller is low.

(6) Since the collars 5a, 5a are integrally formed on the both ends of the roller 5, respectively, it is necessary to provide a clearance 5c (shown in an enlarged portion of FIG. 22) on a corner of a recess portion 5b in the roller 5 for preventing the interference of the roller 4 or for cutting and grinding the roller 5. Accordingly, it takes much time to cut and grind the roller 5 and the productivity of the roller 5 is low.

(7) In the assembling of the rollers 4 and the roller 5, the rollers 4 are previously installed in the recess portion 5b of the roller 5 and then they must be assembled. Thus, there is no flexibility and falling away of the roller 4 may be generated, which decreases the assembling capability.

The roller chain 1' shown in FIG. 23 has the following problems. That is, (8) Since the roller (outer ring) 5' has no an inward collar (5a') the contact area between the roller 5' and the thrust bearings receiving plate 6' is small and a thrust load applied to the roller 5' is locally received by the thrust bearings receiving plate 6'. Thus, the wear of the thrust bearings receiving plate 6' tends to progress.

(9) Since the roller 5' and the thrust bearings plate 6' are completely independent of each other, the thrust bearings receiving plate 6' cannot limit a skew generated in the rollers 4' and the skew are easily generated.

(10) A gap is produced between the roller 5' and the thrust bearings receiving plate 6'. Thus, a lubricant such as grease or the like easily leaks outside thereby to be exhausted so that the wear between the roller 5' and the thrust bearings receiving plate 6' rapidly progresses. Further, outside dust particles easily enters through the gap and the deterioration of lubricant and wear are promoted.

Further, in a general roller bearing in which the above-mentioned retainer was incorporated, the retainer has a pocket that holds and guides the whole each roller 4. Accordingly, the following problems occur. That is,

(11) Since each pocket embraces the whole each roller 4, the space between the rollers 4 is small, and since the retainer is complex the lubricant such as grease or the like cannot be uniformly held in the roller bearings and the lubricant holding amount is also small.

(12) The pocket that holds the whole each roller must be machined accurately and the production of the retainer is difficult and very expensive.

(13) Even each roller bearing using the same diameter, if the length of the roller is changed, needs a retainer having a pocket corresponding the changed length. Thus, a large number of types of the retainers must be kept and the parts management is no easy matter and costs a lot.

SUMMARY OF THE INVENTION

It is, accordingly, a general object of the present invention to provide roller bearings in which there is no contact between the rollers, a lubricant can be sufficiently held, a skew is not generated easily, and the roller bearings has a strong resistance to a thrust load and has sealing properties.

Another object of the present invention is to provide roller bearings that have excellent productivity and assembling capability.

Another object of the present invention is to provide a roller chain incorporating the roller bearings in which there is no contact between the rollers, a lubricant can be sufficiently held, a skew is not generated easily, and the roller bearings has a strong resistance to a thrust load and has sealing properties.

Still another object of the present invention is to provide a roller chain incorporating the roller bearings that have excellent productivity and assembling capability.

According to one aspect of the present invention, there is provided roller bearings wherein a plurality of rollers are disposed between an outer ring and an inner ring comprising substantially ring-shaped retainers disposed on both ends of said outer ring respectively, at least one of said retainers including a plurality of pockets for guiding at least a part of each of said rollers on the inner side of the retainer.

According to another aspect of the present invention, there is provided a roller chain incorporating the roller bearings wherein a plurality of rollers are disposed between a roller that functions as an outer ring and a bush that functions as an inner ring comprising a substantially ring-shaped retainer disposed on both ends of said roller respectively, said retainer including a plurality of pockets for guiding at least a part of each of said rollers on the inner side of the retainer.

According to still another aspect of the present invention, there is provided a roller chain incorporating the roller bearings wherein a plurality of rollers are disposed between a roller that functions as an outer ring and a pin that functions as an inner ring comprising a substantially ring-shaped retainer disposed on both ends of said roller respectively, said retainer including a plurality of pockets for guiding at least a part of each of said rollers on the inner side of the retainer.

In the above-mentioned aspects of the present invention, said retainer is preferably made of metal having wear resistance such as copper alloy or oleo-sintered alloy or resin having lubricating properties. Further, the retainer may be subjected to processing such as heat treatment, changing surface roughness, and forming a number of pits with a shot or a WPC to improve wear resistance of the retainer.

It is preferable that the pockets are formed on the retainer for at least one side of said roller. If the number of the pockets is further increased, the effects of the pockets can be obtained. One or more roller can be guided by one pocket.

Further, in the above-mentioned aspect of the present invention, preferably, the shape of said pocket is semicircular, circular, oval, polygonal, or similar to the end face of the roller. The pockets formed on both ends of said retainers may be asymmetric. The size of the pocket is not particularly limited, but a pocket having the same diameter as the roller or more can smoothly be rotated. Further, even if the pocket does not cover the whole outer periphery of the roller, if a part of the pocket comes contact with the roller and can guide the roller, the pocket can be used. Further, the pocket may even independently be connected to the rollers and the shapes of the pockets are not necessarily the same.

Further, it is preferable that the space between said outer ring and said inner ring is filled with a lubricant such as grease. However, even in a case where a lubricant such as grease or the like cannot be used, sliding between rollers does not occur. Thus, the chain roller or chain of the present invention can be used without a lubricant. Further, if heat-resisting material is used as the retainer, the roller chain or chain of the present invention can be used at a high temperature.

According to still another aspect of the present invention there is provided roller bearings-incorporated chain wherein a plurality of rollers are disposed between a bush that functions as an outer ring and a pin that functions as an inner ring comprising: engagement holes for the respective rollers formed along the respective central axes of said rollers; and a substantially ring-shaped retainer disposed on both ends of said roller respectively, said retainer including a guide portion for rotatably guiding said rollers while engaged in said engagement holes of said rollers. Further, the present invention can be applied to a rollers-incorporated cam follower and a roller follower.

According to the present invention, when the outer ring (roller) is rotated a roller that contacts with an inner periphery of the outer ring is automatically rotated and a rolling contact occurs. A retainer that guides the roller is rotated around an inner ring (a bush or a pin) by this automatic rotation of the roller. Then, since the roller is guided by the retainer, the contact and wear between the rollers are not generated and collision noises do not occur. Further, since there is a certain gap or space between the rollers, a lubricant such as grease or the like can be maintained in an appropriate amount and uniformly. Further, there is a space for a clearance (maintenance) against the intruders such as abrasive powder, dust particles and the like from outside, abrasive resistance is improved. The direction of rotation of the retainer is the same as that of the outer ring. Thus, a roller is regularly guided between the outer ring (roller) and the inner ring (bush or pin) and the outer ring is smoothly rotated.

Since the pocket that guides the roller does not grasp or fix the roller strongly, a slight slip between the roller and the retainer occurs according to the rotation of the roller. However, the roller and the retainer are hardly abraded. Further, although the radial load acts on the outer ring, the roller and the inner ring, it does not act on the retainer at all. Accordingly, the retainer is not abraded or broken by the radial load.

The number of rotation of the retainer is about half of the number of rotation of the outer ring irrespective of the diameter and the radius of revolution of the roller. Therefore, since the retainer is rotated with further largely decelerated than the rotation of the outer ring, when the outer roller receives a thrust load, sliding speeds of the retainer and the inner link plate are decreased. Thus, the wear of the retainer can be suppressed.

BRIEF DESCRIPTION OF THE DRAWINGS

Preferred embodiments of the present invention will now be described in detail, by way of example only, with reference to the accompanying drawings, in which:

FIG. 2(A) is a cross-sectional view thereof, and FIG. 2(B) is a plan view thereof;

FIG. 6(A) is a plan view of one retainer, and FIG. 6(B) is a plan view of the other retainer;

FIG. 8(A) shows a structure where a labyrinth was formed between the roller and the retainer, FIG. 8(B) shows a structure where ring-shaped grooves were formed on the retainer, and FIG. 8(C) shows a structure where a seal ring was disposed between the roller and the retainer;

FIG. 12(A) is a cross-sectional view thereof, and FIG. 12(B) is a plan view thereof;

FIG. 14(A) is a cross-sectional view thereof, and FIG. 14(B) is a plan view thereof;

FIG. 18(A) is a cross-sectional view thereof, and FIG. 18(B) is a plan view thereof;

FIG. 19(A) is a cross-sectional view thereof, and FIG. 19(B) is a plan view thereof;

FIG. 21(A) is a cross-sectional view thereof, and FIG. 21(B) is a plan view thereof;

DETAILED DESCRIPTION OF THE PREFERRED EMBODIMENTS

The following description is merely exemplary in nature and is in no way intended to limit the invention or its application or uses.

Figure 1:
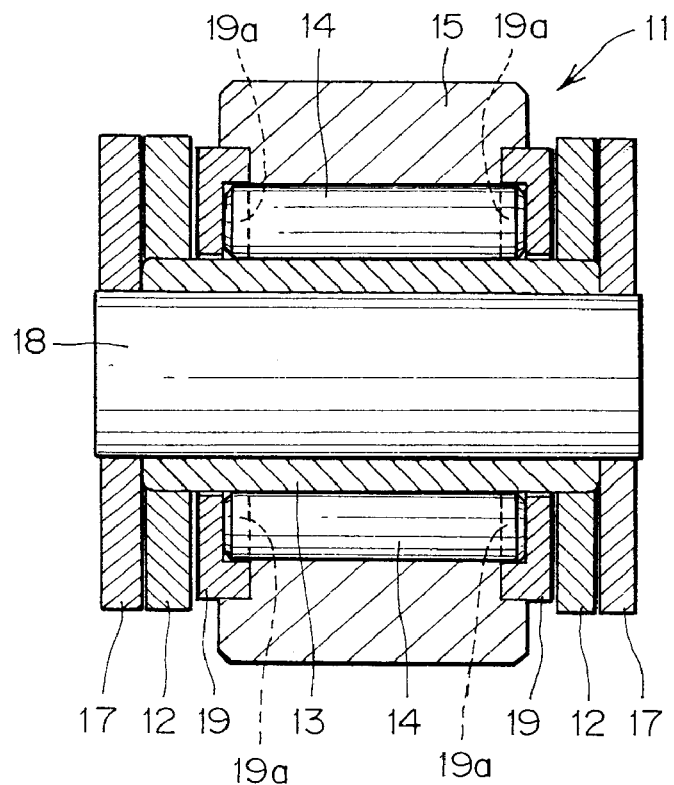
FIG. 1 is a cross-sectional view of a roller chain incorporating the roller bearings according to an embodiment 1 of the present invention.
Figure 2A:
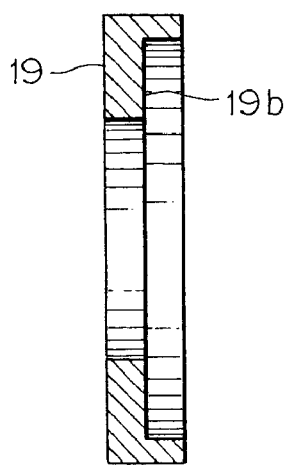
FIGS. 2(A) and 2(B) show a retainer used in the roller chain shown in FIG. 1, particularly.
Figure 2B:
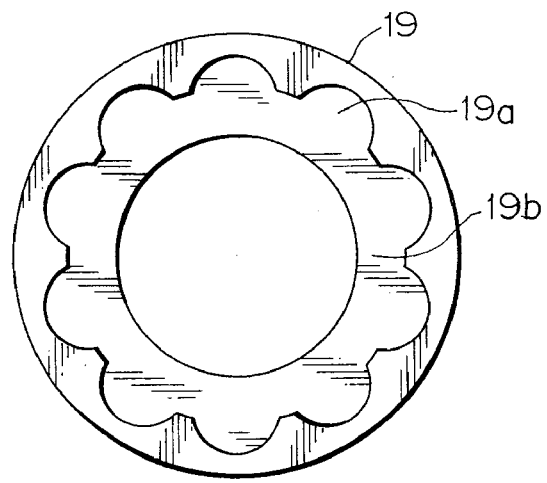

Embodiment 1 according to the present invention will be described with reference to FIG. 1 and FIGS. 2(A) and 2(B). FIG. 1 is a cross-sectional view of a roller chain incorporating the roller bearings according to Embodiment 1 of the present invention. FIGS. 2(A) and 2(B) show a retainer used in the roller chain shown in FIG. 1, particularly, FIG. 2(A) is a cross-sectional view of the retainer, and FIG. 2(B) is the plan view thereof. In a roller chain 11 shown in FIG. 1 a plurality of rollers 14, for example, 10 rollers 14 are disposed on an outer periphery of a bush 13 whose both ends were connected to a pair of inner link plates 12, a roller 15 is attached so as to surround the rollers 14. Further, a pair of outer link plates 17 is disposed outside the inner link plates 12 and the pair of outer link plates 17 is connected to each other by means of a pin 18 that penetrates the bush 13. Further, the space between the roller 15 and the bush 13 is filled with a lubricant such as grease or the like. In the roller chain 11, the roller 15 functions as an outer ring of the roller bearings, the plurality of rollers 14 function as a rolling body of the roller bearings and the bush 13 functions as an inner ring of the roller bearings. Therefore, the roller 15, the rollers 14 and the bush 13 constitute the roller bearings.

Further, as shown in FIG. 1, a substantially ring-shaped retainer 19 is disposed on each of both ends of the roller 15. As shown in FIG. 2(A) and FIG. 2(B), the retainer 19 is substantially ring-shaped, and a recess portion 19b is formed on one side of the retainer 19. Further, a plurality of semicircular pockets 19a, in this Embodiment 10 pockets, are continuously formed in this recess portion 19b. And the plurality of pockets 19a hold and guide the respective ends of the rollers 14.

In the roller chain 11 shown in FIG. 1, when the roller 15 is rotated the roller 14 in contact with an inner periphery of the roller 15 is rotated, whereby a rolling contact is generated. By the rotation of this roller 14 the retainer 19 that guides the rollers 14 is rotated around the bush 13. Then since the all rollers 14 (10 rollers) are guided by the left and right pockets 19a, a contact and wear between the rollers 14 are not generated and collision noises do not occur. Further, there is a certain gap between the rollers 14 and a lubricant such as grease can be held therein in an appropriate amount and uniformly. Further, since the roller chain 11 has a space for a clearance (maintenance) against intruders such as wear powder, and dust particles and the like, which entered from outside, wear resistance is improved. The direction of rotation of the retainer 19 is the same as that of the roller 15. Accordingly, the roller 14 is regularly guided between the roller 15 and the bush 13 so that the roller 15 is smoothly rotated.

Since the pocket 19a that guides the roller 14 does not grasp or fix the roller 14 strongly, slight sliding occurs between the roller 14 and the retainer 19 according to the rotation of the roller 14. However, the roller 14 and the retainer 19 are hardly abraded. Further, although the radial load acts on the roller 15, the roller 14 and the bush 13, it does not act on the retainer 19 at all. Accordingly, the retainer 19 is not abraded or broken by the radial load.

The number of rotation of the retainer 19 is about half of the number of rotation of the roller 15 irrespective of the diameter and the radius of revolution of the roller 14. Therefore, since the retainer 19 is rotated further largely decelerated than the rotation of the roller 15, when the roller 15 receives a thrust load, sliding speeds of the retainer 19 and the inner link plate 12 are decreased. Thus, the wear of the retainer 19 can be suppressed.

Further, in the roller chain 11 the roller 15 has no collar and it is very easy to machine. Thus, the productivity of the roller 15 is excellent. Further, during assembling the roller chain 11 the rollers 14 are easily inserted into the roller 15 and the rollers 14 fitted into the pockets 19a are not fallen out. Thus, assembling capability of the roller chain 11 is also excellent.

Figure 3:
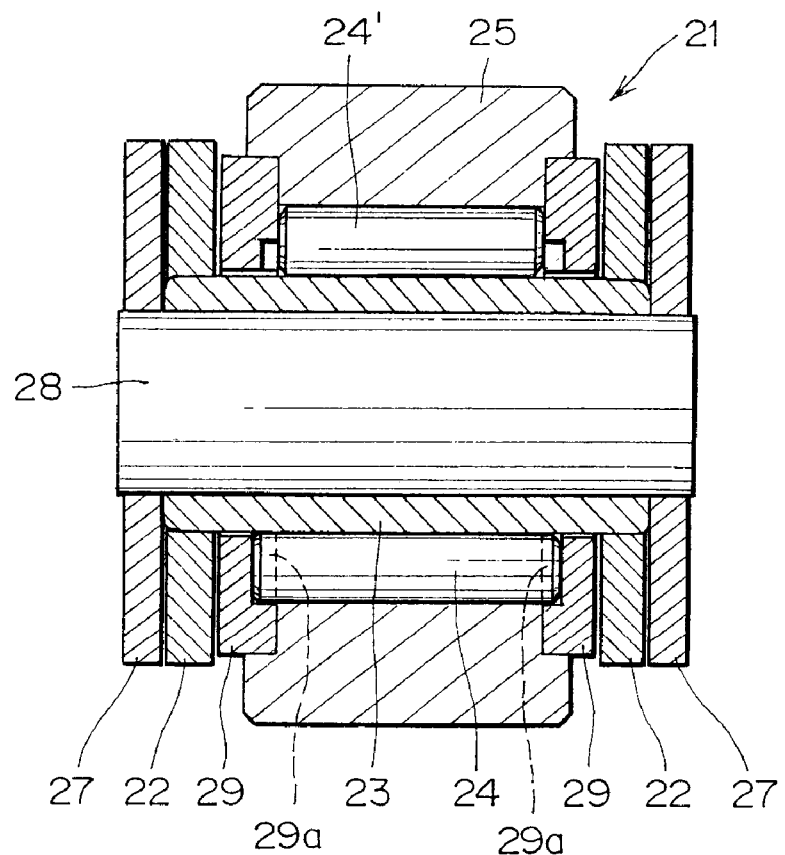
FIG. 3 is a cross-sectional view of a roller chain incorporating the roller bearings according to an embodiment 2 of the present invention.
Figure 4:
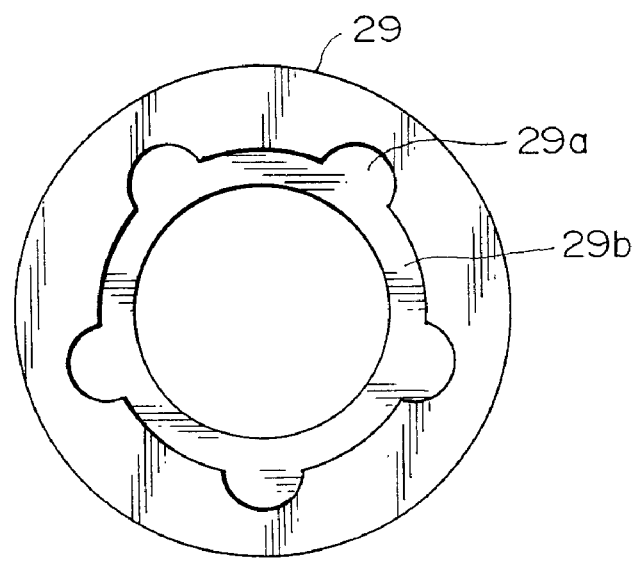
FIG. 4 is a plan view of a retainer used in the roller chain shown in FIG. 3.

Embodiment 2 according to the present invention will be described with reference to FIG. 3 and FIG. 4. FIG. 3 is a cross-sectional view of a roller chain incorporating the roller bearings according to Embodiment 2 of the present invention. FIG. 4 is a plan view of a retainer used in the roller chain shown in FIG. 3. In a roller chain 21 shown in FIG. 3, 5 rollers 24 and 5 rollers 24' are alternately disposed on an outer periphery of a bush 23 whose both ends were connected to a pair of inner link plates 22, a roller 25 is attached so as to surround 5 rollers 24 and 5 rollers 24'. Further, a pair of outer link plates 27 is disposed outside the inner link plates 22 and the pair of outer link plates 27 is connected to each other by means of a pin 28 that penetrates the bush 23. Further, the space between the roller 25 and the bush 23 is filled with a lubricant such as grease or the like. In the roller chain 21, the roller 25 functions as an outer ring of the roller bearings, the plurality of rollers 24, 24' function as a rolling body of the roller bearings and the bush 23 functions as an inner ring of the roller bearings. Therefore, the roller 25, the rollers 24, 24' and the bush 23 constitute the roller bearings.

Further, as shown in FIG. 3, a substantially ring-shaped retainer 29 is disposed on each of both ends of the roller 25. As shown in FIG. 4, the retainer 29 is substantially ring-shaped, and a recess portion 29b is formed on one side of the retainer 29. Further, a plurality of semicircular pockets 29a, in this Embodiment 5 pockets, are continuously formed in this recess portion 29b. And the plurality of pockets 29a (5 pockets) hold and guide the respective ends of the rollers 24, as shown in FIG. 3. The roller 24' disposed between the rollers 24 has roller length shorter than the roller 24 whose each end is held and guided by the pocket 29a. Therefore, in the roller 24' having a shorter roller length the end of the roller 24' is not held and guided by the pocket 29a.

As described above, in the roller chain 21 shown in FIG. 3, the rollers 24' having shorter roller length are used. Thus, as shown in Japanese Patent Application No. Hei. 12-240072, which is a prior application, when a thrust load is applied to the roller (outer ring) 25, a circumferential gap between the roller 24' having shorter roller length and the roller 24 removes the skew so that the rotation of the roller 25 is stabilized and the wear of the retainer 29 can be suppressed. Other points of the roller chain 21 are substantially the same as in the roller chain 11 shown in FIG. 1, and the operation and effects of the roller chain 21 are also substantially the same as in the roller chain 11. Thus, other explanation of the roller chain 21 is omitted.

Figure 5:
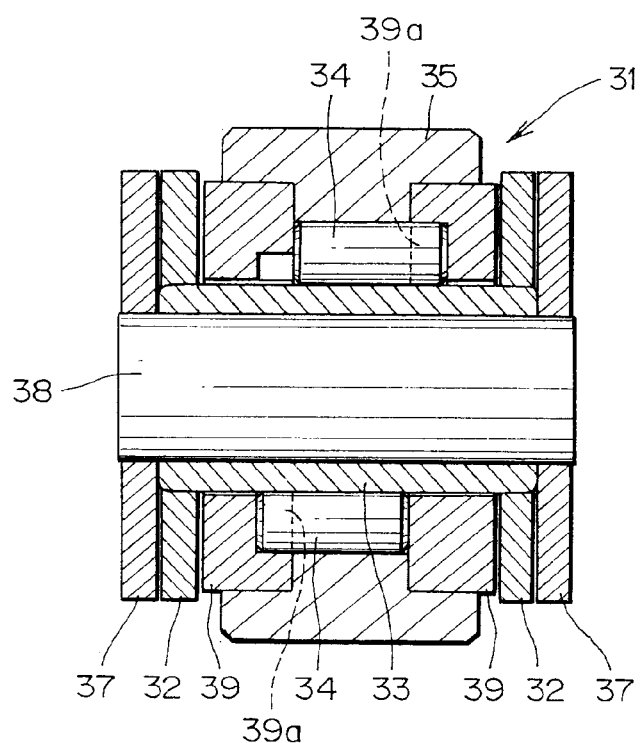
FIG. 5 is a cross-sectional view of a roller chain incorporating the roller bearings according to an embodiment 3 of the present invention.
Figure 6A:
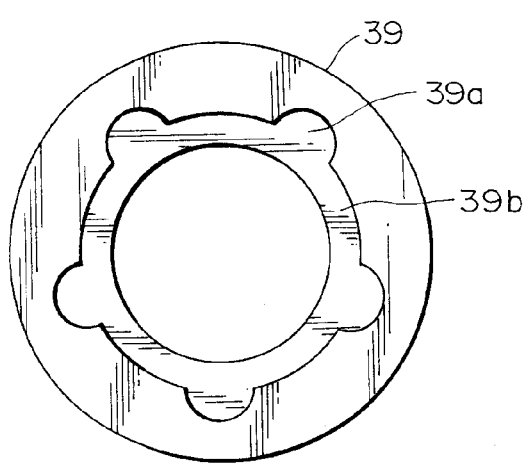
FIGS. 6(A) and 6(B) are plan views of a retainer used in the roller chain shown in FIG. 5, particularly.
Figure 6B:
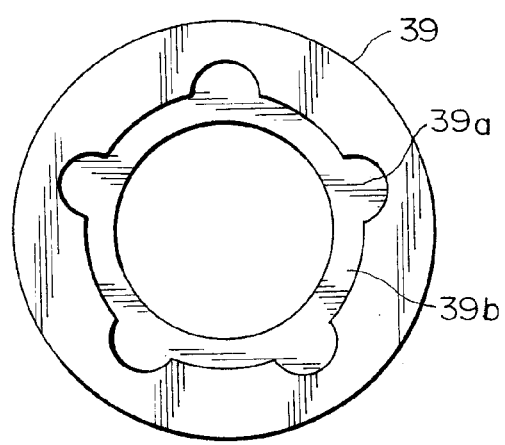

Embodiment 3 according to the present invention will be described with reference to FIG. 5 and FIGS. 6(A) and 6(B). FIG. 5 is a cross-sectional view of a roller chain incorporating the roller bearings according to Embodiment 3 of the present invention. FIGS. 6(A) and 6(B) are plan views of a retainer used in the roller chain shown in FIG. 5, particularly, FIG. 6(A) is a plan view of one retainer, and FIG. 6(B) is a plan view of the other retainer. In a roller chain 31 shown in FIG. 5 a plurality of rollers 34, for example, 10 rollers 34 are disposed on an outer periphery of a bush 33 whose both ends were connected to a pair of inner link plates 32, a roller 35 is attached so as to surround the rollers 34. Further, a pair of outer link plates 37 is disposed outside the inner link plates 32 and the pair of outer link plates 37 is connected to each other by means of a pin 38 that penetrates the bush 33. Further, the space between the roller 35 and the bush 33 is filled with a lubricant such as grease or the like. In the roller chain 31, the roller 35 functions as an outer ring of the roller bearings, the plurality of rollers 34 function as a rolling body of the roller bearings and the bush 33 functions as an inner ring of the roller bearings. Therefore, the roller 35, the rollers 34 and the bush 33 constitute the roller bearings.

Further, as shown in FIG. 5, a substantially ring-shaped retainer 39 is disposed on each of both ends of the roller 35. As shown in FIG. 6(A) and FIG. 6(B), the retainer 39 is substantially ring-shaped, and a recess portion 39b is formed on one side of the retainer 39. Further, a plurality of semicircular pockets 39a, in this Embodiment 5 pockets, are formed continuously to this recess portion 39b. And the plurality of pockets 39a hold and guide the respective ends of the rollers 34. Although this retainer 39 has the same shape as the retainer 29 shown in FIG. 4, the left retainer 39 and the right retainer 39 have the respective pockets 39a whose positions or phases are shifted by 36 degrees, as shown in FIGS. 6(A) and 6(B). That is, the both retainers 39 are not symmetrical with respect to a vertical line. Therefore, as shown in FIG. 5, one end of each roller 34 is guided by the pocket 39a, but the other end thereof is not guided by the pocket 39a. Other points of the roller chain 31 are substantially the same as in the roller chain 11 shown in FIG. 1, and the operation and effects of the roller chain 31 are also substantially the same as in the roller chain 11. Thus, other explanation of the roller chain 31 is omitted.

Figure 7:
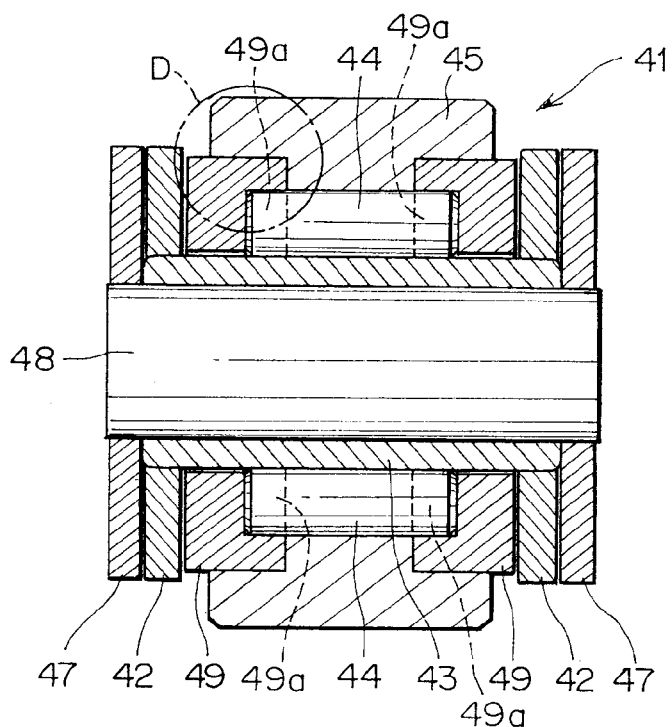
FIG. 7 is a cross-sectional view of a roller chain incorporating the roller bearings according to an embodiment 4 of the present invention.
Figure 8A:
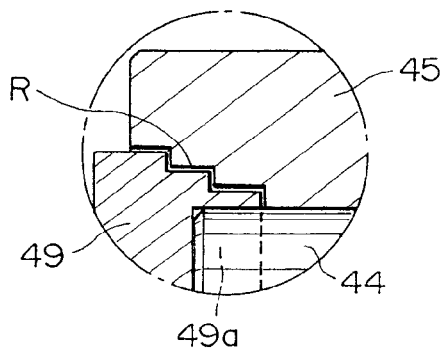
FIGS. 8(A), 8(B) and 8(C) are enlarged views of the circle D in FIG. 7, particularly.
Figure 8B:
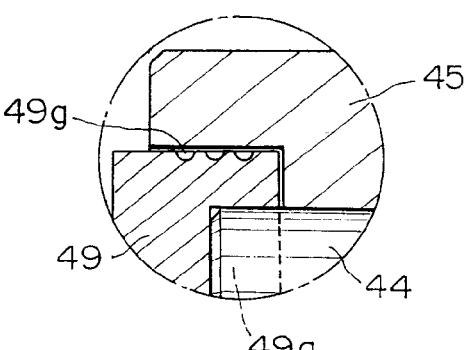
Figure 8C:
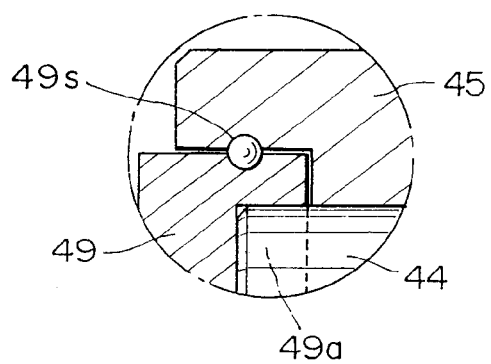
Figure 9:
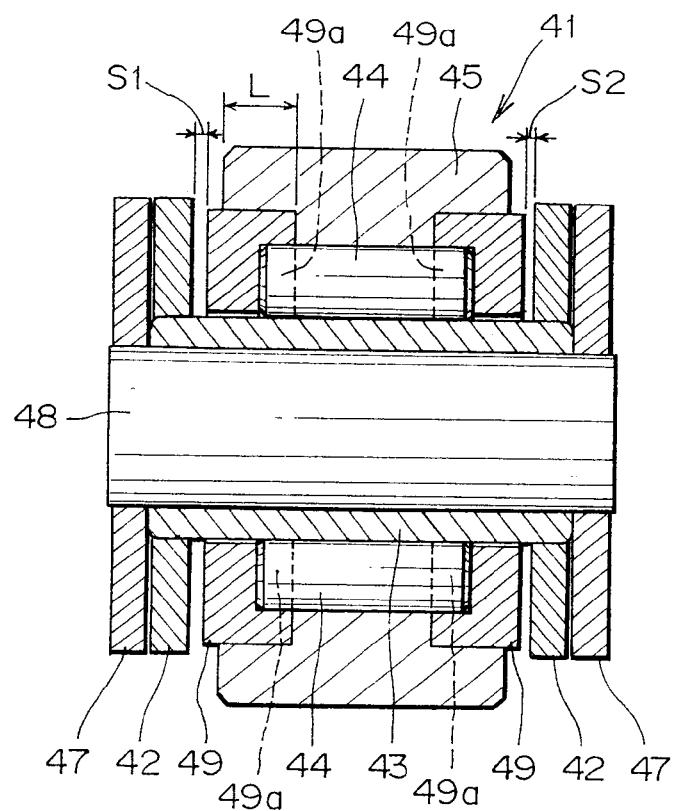
FIG. 9 is a cross-sectional view for explaining the size of the roller chain shown in FIG. 7.

Embodiment 4 according to the present invention will be described with reference to FIG. 7, FIGS. 8(A), 8(B) and 8(C) and FIG. 9. FIG. 7 is a cross-sectional view of a roller chain incorporating the roller bearings according to Embodiment 4 of the present invention. FIGS. 8(A), 8(B) and 8(C) are enlarged views of a circle D portion in FIG. 7, particularly, FIG. 8(A) shows the D portion in which a labyrinth R was formed between the roller 45 and the retainer 49, FIG. 8(B) shows the D portion in which annular shaped grooves 49g were formed on the retainer 49, and FIG. 8(C) shows the D portion in which a seal ring 49s was disposed between the roller 45 and the retainer 49. FIG. 9 is a cross-sectional view of a roller chain for explaining the sizes and length associated therewith of the roller chain shown in FIG. 7. In a roller chain 41 shown in FIG. 7 a plurality of rollers 44, for example, 10 rollers 44 are disposed on an outer periphery of a bush 43 whose both ends were connected to a pair of inner link plates 42, and a roller 45 is attached so as to surround the rollers 44. Further, a pair of outer link plates 47 is disposed outside the inner link plates 42 and the pair of outer link plates 47 is connected to each other by means of a pin 48 that penetrates the bush 43. Further, the space between the roller 45 and the bush 43 is filled with a lubricant such as grease or the like. In the roller chain 41, the roller 45 functions as an outer ring of the roller bearings, the plurality of rollers 44 function as a rolling body of the roller bearings and the bush 43 functions as an inner ring of the roller bearings. Therefore, the roller 45, the rollers 44 and the bush 43 constitute the roller bearings.

Further, as shown in FIG. 7, a substantially ring-shaped retainer 49 is disposed on each of both ends of the roller 45. As shown in FIG. 7 and FIGS. 8(A), 8(B) and 8(C), the retainer 49 is substantially ring-shaped. Further, a plurality of pockets 49a, in this Embodiment, 10 pockets, are formed in one side of the retainer 49. And the plurality of pockets 49a hold and guide the respective ends of the rollers 44.

The roller chain 41 shown in FIG. 7 enhances sealing properties by providing sealing means between the roller 45 and the retainer 49. In the roller chain 41 shown in FIG. 7, there is a small gap between the roller 45 and the retainer 49 as shown in FIGS. 8(A), 8(B) and 8(C). When the roller 45 is rotated the retainer 49 is simultaneously rotated in the same direction and in different numbers of revolutions. The enlarged portion shown in FIG. 8(A) shows a structure where a labyrinth R was formed between the roller 45 and the retainer 49 as sealing means. Further, the enlarged portion shown in FIG. 8(B) shows a structure where three annular grooves 49g were formed on the outer periphery of the retainer 49 as sealing means. This annular grooves 49g are filled with grease. Further, the enlarged portion shown in FIG. 8(C) shows a structure where a seal ring 49s such as an O ring or the like is disposed between the roller 45 and the retainer 49 as sealing means. By providing these sealing means the leak of the lubricant such as grease or the like from the small gap between the roller 45 and the retainer 49 to the outside can be prevented, and the entry of dust particles from the outside can also be prevented.

Further, the size and length associated therewith of the roller chain 41 shown in FIG. 7 will be explained. As shown in FIG. 9, the length L that the retainer 49 overlaps on the roller 45 is set to a distance longer than the gap S (S1+S2) between the retainer 49 and the inner link plate 42 so that the retainer 49 is not fallen. In this case the length of the roller 44 is set so that the roller 44 does not come out of the pocket 49a. Other points of the roller chain 41 are substantially the same as in the roller chain 11 shown in FIG. 1, and the operation and effects of the roller chain 41 are also substantially the same as in the roller chain 11. Thus, other explanation of the roller chain 41 is omitted.

Figure 10:
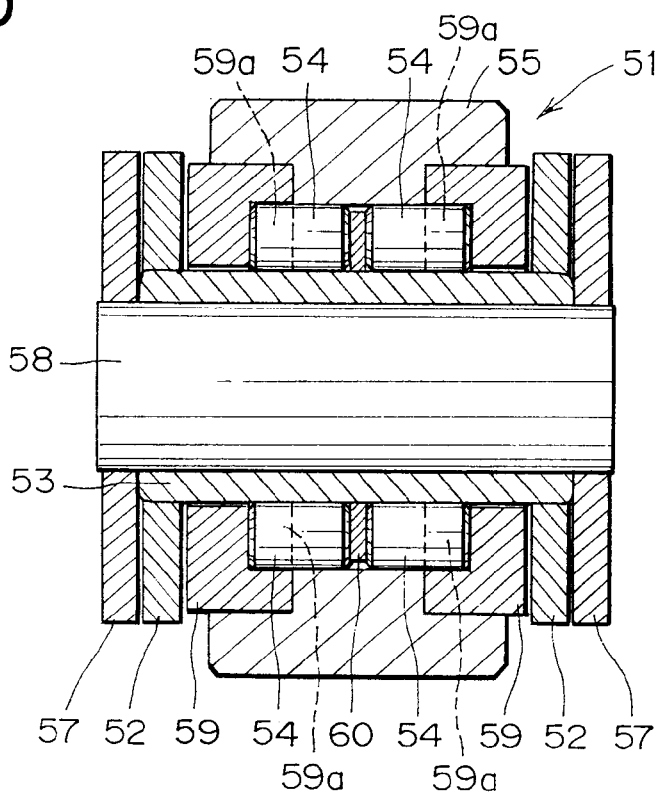
FIG. 10 is a cross-sectional view of a roller chain incorporating the roller bearings according to an embodiment 5 of the present invention.

Embodiment 5 according to the present invention will be described with reference to FIG. 10. FIG. 10 is a cross-sectional view of a roller chain incorporating the roller bearings according to Embodiment 5 of the present invention. In a roller chain 51 shown in FIG. 10 two rows of rollers 54, 54 for example, 10 rollers 54 each are disposed on an outer periphery of a bush 53 whose both ends were connected to a pair of inner link plates 52, and a roller 55 is attached so as to surround the two rows of rollers 54, 54. Further, a pair of outer link plates 57 is disposed outside the inner link plates 52 and the pair of outer link plates 57 is connected to each other by means of a pin 58 that penetrates the bush 53. Further, the space between the roller 55 and the bush 53 is filled with a lubricant such as grease or the like. In the roller chain 51, the roller 55 functions as an outer ring of the roller bearings, the two rows of rollers 54, 54 function as a rolling body of the roller bearings and the bush 53 functions as an inner ring of the roller bearings. Therefore, the roller 55, the two rows of rollers 54, 54 and the bush 53 constitute the roller bearings. Lengths of two rows of rollers 54, 54 may be the same or different from each other.

Further, as shown in FIG. 10, a substantially ring-shaped retainer 59 is disposed on each of both ends of the roller 55. The retainer 59 is substantially ring-shaped. Further, a plurality of pockets 59a, in this Embodiment, 10 pockets, are formed in one side of the retainer 59. And the plurality of pockets 59a hold and guide the respective ends of the rollers 54.

The left and right retainers 59, 59 each guide one end of each row of the rollers 54 and can be rotated individually. Further, a partition 60 is intervened between the respective rows of rollers 54, 54, and the left and right rows of rollers 54, 54 do not interfere with each other. Thus, further smooth rotation can be maintained. Then, even in a case where a very large thrust load is applied to the roller 55 and one retainer 59 is pressed between the roller 55 and the inner link plate 52, thereby becoming difficult to be rotated, the radial load applied to the roller 55 is supported by the row of rollers that the other retainer 59 guides, so that smooth rotation can be maintained. Other points of the roller chain 51 are substantially the same as in the roller chain 11 shown in FIG. 1, and the operation and effects of the roller chain 51 are also substantially the same as in the roller chain 11. Thus, other explanation of the roller chain 51 is omitted.

Figure 11:
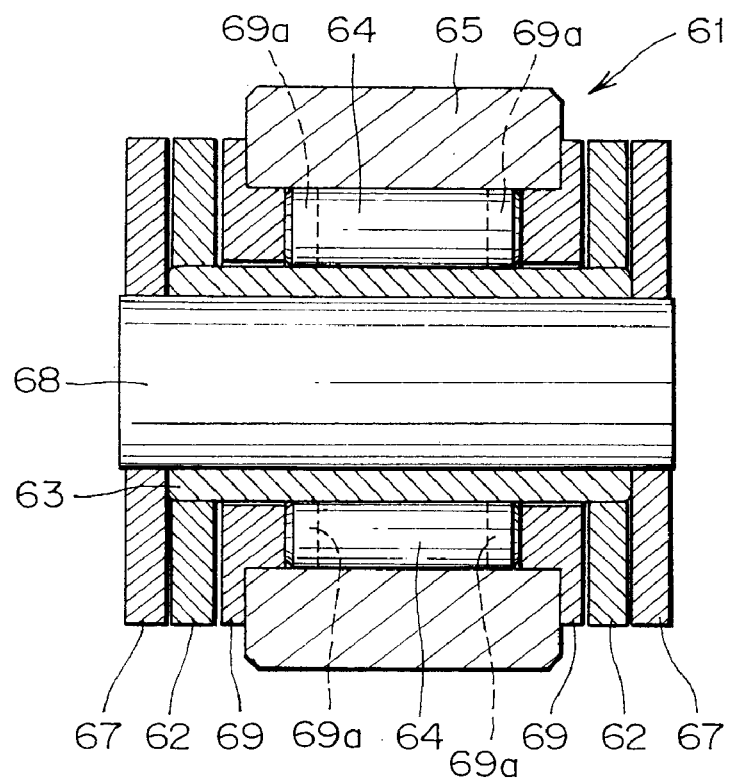
FIG. 11 is a cross-sectional view of a roller chain incorporating the roller bearings according to an embodiment 6 of the present invention.
Figure 12A:
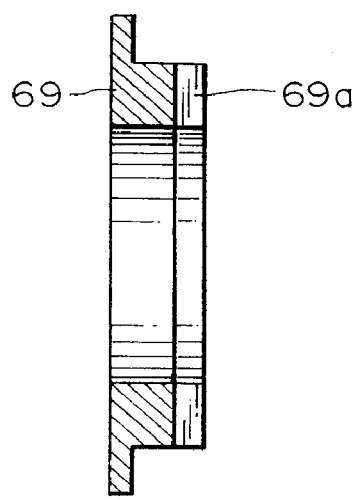
FIGS. 12(A) and 12(B) show a retainer used in the roller chain shown in FIG. 11, particularly.
Figure 12B:
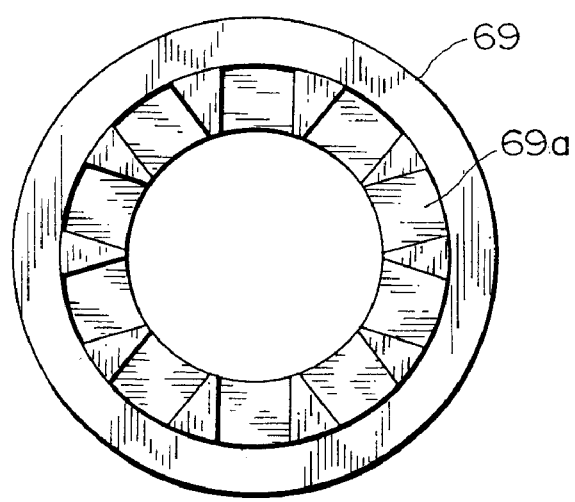

Embodiment 6 according to the present invention will be described with reference to FIG. 11 and FIGS. 12(A) and 12(B). FIG. 11 is a cross-sectional view of a roller chain incorporating the roller bearings according to Embodiment 6 of the present invention. FIGS. 12(A) and 12(B) show a retainer used in the roller chain shown in FIG. 11, particularly, FIG. 12(A) is a cross-sectional view thereof and FIG. 12(B) is a plan view thereof. In a roller chain 61 shown in FIG. 11 a plurality of rollers 64, for example, 10 rollers 64 each are disposed on an outer periphery of a bush 63 whose both ends were connected to a pair of inner link plates 62, and a roller 65 is attached so as to surround the rollers 64. The roller 65 has inner and outer peripheries each having a straight cylindrical shape. Further, a pair of outer link plates 67 is disposed outside the inner link plates 62 and the pair of outer link plates 67 is connected to each other by means of a pin 68 that penetrates the bush 63. Further, the space between the roller 65 and the bush 63 is filled with a lubricant such as grease or the like. In the roller chain 61, the roller 65 functions as an outer ring of the roller bearings, the rollers 64 function as a rolling body of the roller bearings and the bush 63 functions as an inner ring of the roller bearings. Therefore, the roller 65, the rollers 64 and the bush 63 constitute the roller bearings.

Further, as shown in FIG. 11, a substantially ring-shaped retainer 69 is disposed on each of both ends of the roller 65. As shown in FIGS. 12(A) and 12(B), the retainer 69 is substantially ring-shaped. Further, a plurality of pockets 69a, in this Embodiment, 10 pockets, each having a rectangular shape in a plan view are formed in one side of the retainer. And the respective pockets 69a hold and guide the respective ends of the rollers 64. Other points of the roller chain 61 are substantially the same as in the roller chain 11 shown in FIG. 1, and the operation and effects of the roller chain 61 are also substantially the same as in the roller chain 11. Thus, other explanation of the roller chain 61 is omitted.

Figure 13:
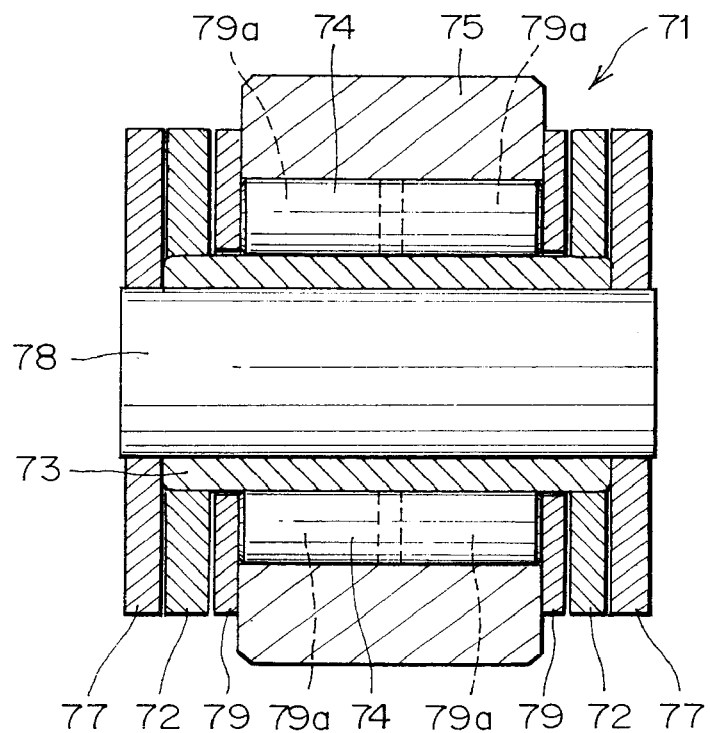
FIG. 13 is a cross-sectional view of a roller chain incorporating the roller bearings according to an embodiment 7 of the present invention.
Figure 14A:
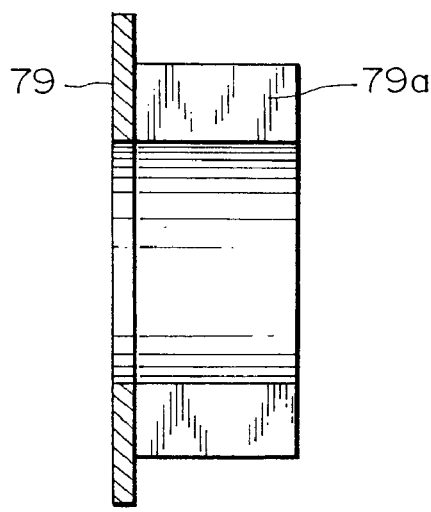
FIGS. 14(A) and 14(B) show a retainer used in the roller chain shown in FIG. 13, particularly.
Figure 14B:
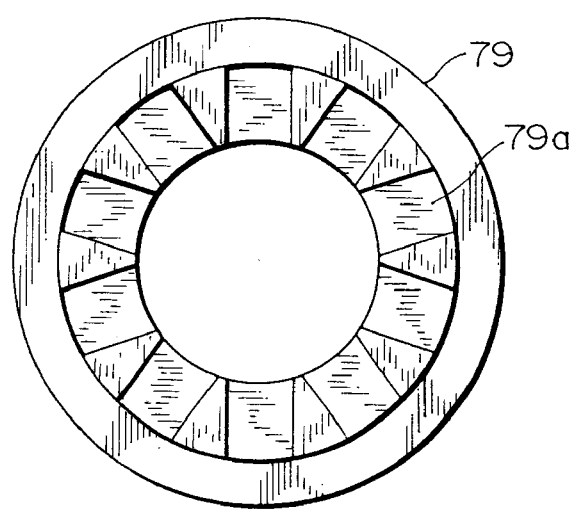

Embodiment 7 according to the present invention will be described with reference to FIG. 13 and FIGS. 14(A) and 14(B). FIG. 13 is a cross-sectional view of a roller chain incorporating the roller bearings according to Embodiment 7 of the present invention. FIGS. 14(A) and 14(B) show a retainer used in the roller chain shown in FIG. 13, particularly, FIG. 14(A) is a cross-sectional view thereof and FIG. 14(B) is a plan view thereof. In a roller chain 71 shown in FIG. 13 a plurality of rollers 74, for example, 10 rollers 74 each are disposed on an outer periphery of a bush 73 whose both ends were connected to a pair of inner link plates 72, and a roller 75 is attached so as to surround the rollers 74. The roller 75 has inner and outer peripheries each having a straight cylindrical shape. Further, a pair of outer link plates 77 is disposed outside the inner link plates 72 and the pair of outer link plates 77 is connected to each other by means of a pin 78 that penetrates the bush 73. Further, the space between the roller 75 and the bush 73 is filled with a lubricant such as grease or the like. In the roller chain 71, the roller 75 functions as an outer ring of the roller bearings, the rollers 74 function as a rolling body of the roller bearings and the bush 73 functions as an inner ring of the roller bearings. Therefore, the roller 75, the rollers 74 and the bush 73 constitute the roller bearings.

Further, as shown in FIG. 13, a substantially ring-shaped retainer 79 is disposed on each of both ends of the roller 75. As shown in FIGS. 14(A) and 14(B), the retainer 79 is substantially ring-shaped. Further, a plurality of pockets 79a, in this Embodiment, 10 pockets, each having a rectangular shape in a plan view are formed in one side of the retainer 79. And the respective pockets 79a hold and guide the respective ends of the rollers 74.

Each pocket 79a has deeper pocket as compared with each of the pockets 69a shown in FIG. 11 and FIGS. 12(A) and 12(B). In this case, as long as the end faces of the retainers 79 facing each other do not contact with each other the depth of the pocket 79a may be increased. Further, the depths of the pockets 79a facing each other are not necessarily the same. If the depth of the pocket 79a is decreased, a space around the roller 74 is increased accordingly and the space that holds a lubricant such as grease or the like is increased, whereby the lubricant can be held in a sufficient amount and uniformly. Further, since the roller chain 71 has a space for a clearance (maintenance) against intruders such as wear powder, and dust particles and the like, which entered from outside, wear resistance is improved. On the other hand, if the depth of the pocket 79a is increased, the strength of the pocket 79a that guides the roller 74 is increased. Further, since the roller 74 is difficult to incline the prevention of skew is achieved and the roller 74 can reliably be guided. The connection of the opposed end faces of the retainers 79 makes the left and right retainers integral and prevention of the skew further reliably becomes possible. Other points of the roller chain 71 are substantially the same as in the roller chain 11 shown in FIG. 1, and the operation and effects of the roller chain 71 are also substantially the same as in the roller chain 11. Thus, other explanation of the roller chain 71 is omitted.

Figure 15:
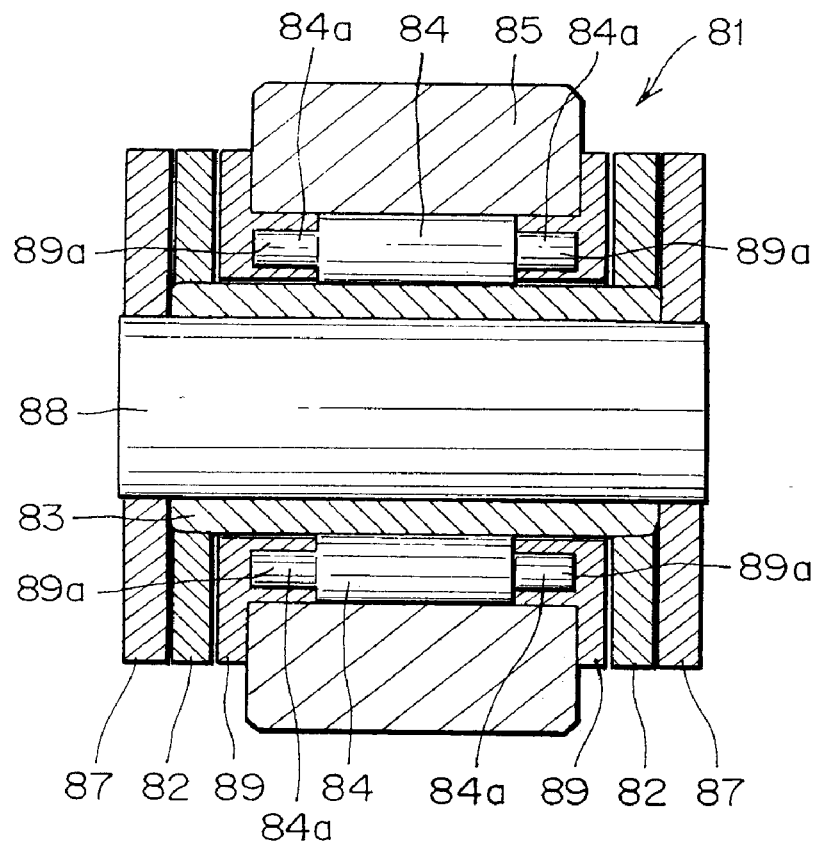
FIG. 15 is a cross-sectional view of a roller chain incorporating the roller bearings according to an embodiment 8 of the present invention.
Figure 16:
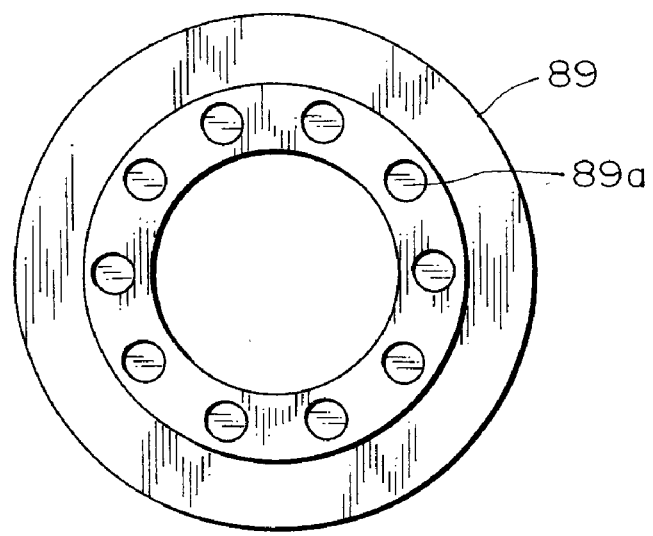
FIG. 16 is a plan view of a retainer used in the roller chain shown in FIG. 15.

Embodiment 8 according to the present invention will be described with reference to FIG. 15 and FIG. 16. FIG. 15 is a cross-sectional view of a roller chain incorporating the roller bearings according to Embodiment 8 of the present invention. FIG. 16 is a plan view of a retainer used in the roller chain shown in FIG. 15. In a roller chain 81 shown in FIG. 15 a plurality of rollers 84, for example, 10 rollers 84 each are disposed on an outer periphery of a bush 83 whose both ends were connected to a pair of inner link plates 82, and a roller 85 is attached so as to surround the rollers 84. Each of the rollers 84 has small diameter portions 84a on the both ends. The roller 85 has inner and outer peripheries each having a straight cylindrical shape. Further, a pair of outer link plates 87 is disposed outside the inner link plates 82 and the pair of outer link plates 87 is connected to each other by means of a pin 88 that penetrates the bush 83. Further, the space between the roller 85 and the bush 83 is filled with a lubricant such as grease or the like. In the roller chain 81, the roller 85 functions as an outer ring of the roller bearings, the rollers 84 function as a rolling body of the roller bearings and the bush 83 functions as an inner ring of the roller bearings. Therefore, the roller 85, the rollers 84 and the bush 83 constitute the roller bearings.

Further, as shown in FIG. 15, a substantially ring-shaped retainer 89 is disposed on each of both ends of the roller 85. As shown in FIG. 16, the retainer 89 is substantially ring-shaped. Further, a plurality of pockets 89a, in this Embodiment, 10 pockets, that hold and guide small diameter portions 84a of the rollers 84 are formed on one side. Since each diameter of the pockets 89a is formed to be the same as that of the small diameter portion 84a, the whole small diameter portion 84a of the roller 84 can be held and guided. Thus the roller 84 is difficult to incline. As a result the prevention of skew is achieved and the roller 84 can reliably be guided. Other points of the roller chain 81 are substantially the same as in the roller chain 11 shown in FIG. 1, and the operation and effects of the roller chain 81 are also substantially the same as in the roller chain 11. Thus, other explanation of the roller chain 81 is omitted.

Figure 17:
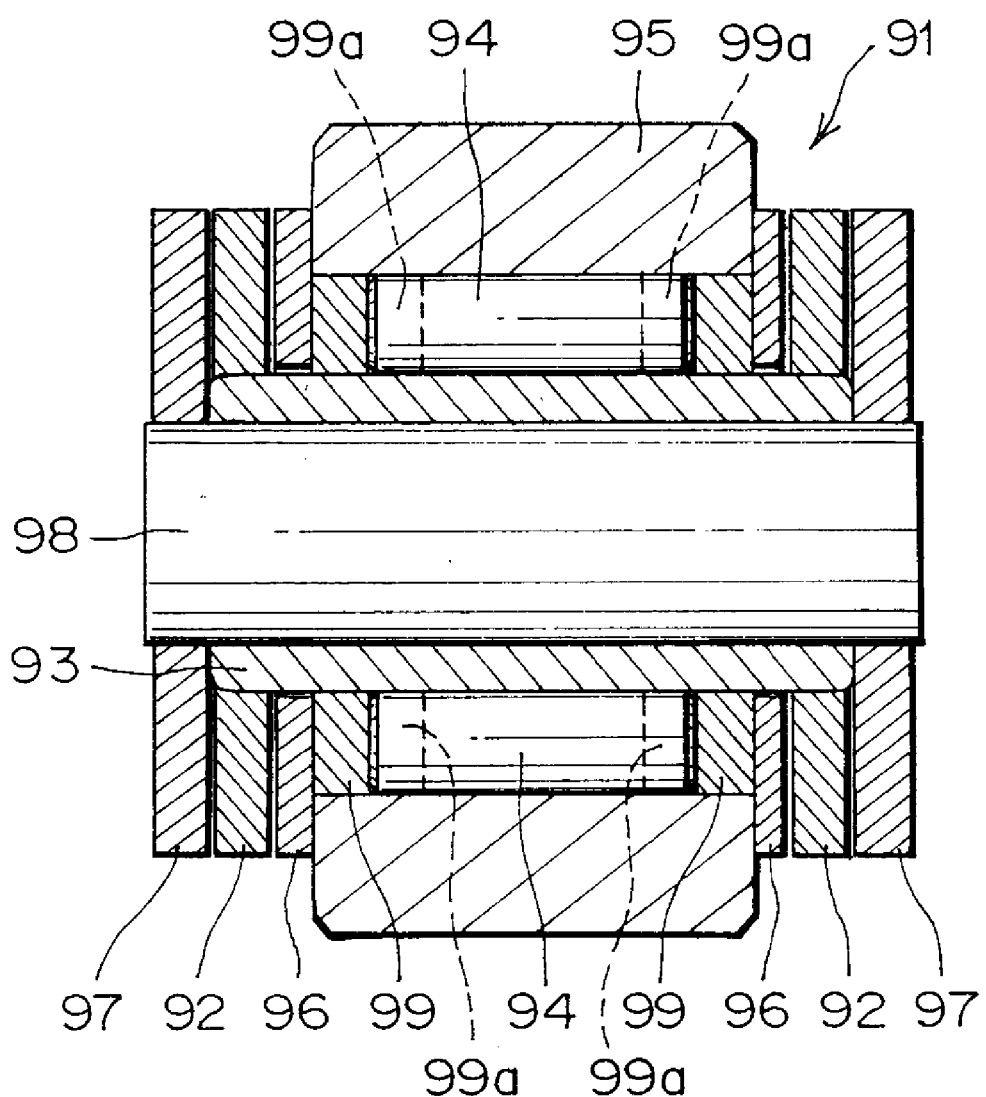
FIG. 17 is a cross-sectional view of a roller chain incorporating the roller bearings according to an embodiment 9 of the present invention.
Figure 18A:
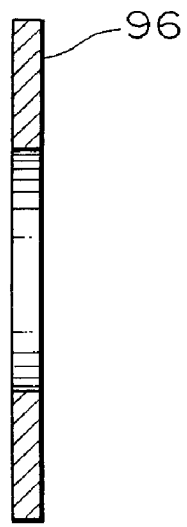
FIGS. 18(A) and 18(B) show a thrust bearings receiving plate used in the roller chain shown in FIG. 17, particularly.
Figure 18B:
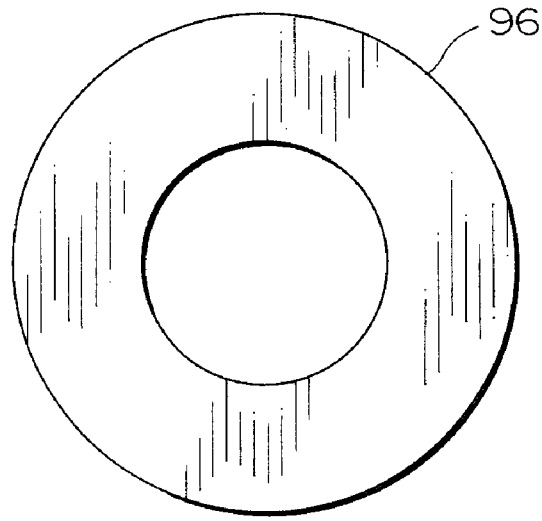
Figure 19A:
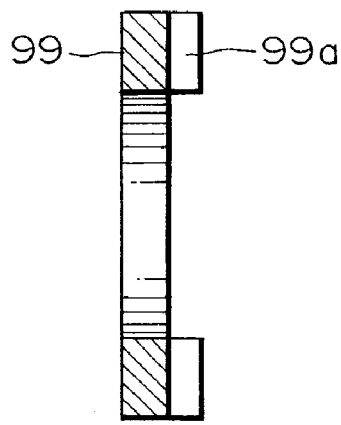
FIGS. 19(A) and 19(B) show a retainer used in the roller chain shown in FIG. 17, particularly.
Figure 19B:
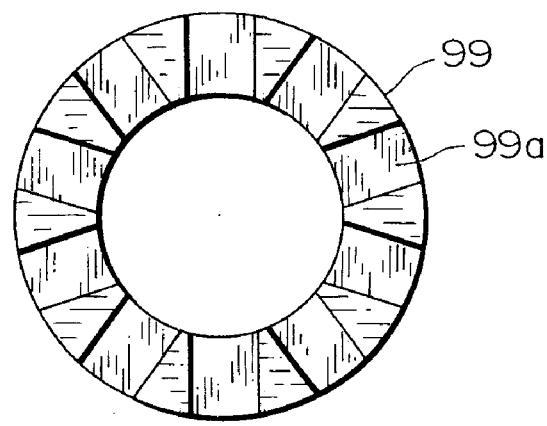

Embodiment 9 according to the present invention will be described with reference to FIG. 17, FIGS. 18(A) and 18(B) and FIGS. 19(A) and 19(B). FIG. 17 is a cross-sectional view of a roller chain incorporating the roller bearings according to Embodiment 9 of the present invention. FIGS. 18(A) and 18(B) show a thrust bearings receiving plate used in a roller chain shown in FIG. 17, particularly, FIG. 18(A) is a cross-sectional view of the thrust bearings receiving plate and FIG. 18(B) is a plan view thereof. FIGS. 19(A) and 19(B) show a retainer used in the roller chain shown in FIG. 17, particularly, FIG. 19(A) is a cross-sectional view of the retainer and FIG. 19(B) is a plan view thereof. In a roller chain 91 shown in FIG. 17 a plurality of rollers 94, for example, 10 rollers 94 each are disposed on an outer periphery of a bush 93 whose both ends were connected to a pair of inner link plates 92, and a roller 95 is attached so as to surround the rollers 94. The roller 95 has inner and outer peripheries each having a straight cylindrical shape. Further, a pair of outer link plates 97 is disposed outside the inner link plates 92 and the pair of outer link plates 97 is connected to each other by means of a pin 98 that penetrates the bush 93. Further, the space between the roller 95 and the bush 93 is filled with a lubricant such as grease or the like. In the roller chain 91, the roller 95 functions as an outer ring of the roller bearings, the rollers 94 function as a rolling body of the roller bearings and the bush 93 functions as an inner ring of the roller bearings. Therefore, the roller 95, the rollers 94 and the bush 93 constitute the roller bearings.

Further, as shown in FIG. 17, a substantially ring-shaped retainer 99 is disposed on each of both ends of the roller 95. As shown in FIGS. 19(A) and 19(B), the retainer 99 is substantially ring-shaped. Further, a plurality of pockets 99a, in this Embodiment, 10 pockets each having a rectangular shape in a plan view are on one side of the retainer 99. Since each pocket 99a holds and guides an end of each roller 94. Further, the roller chain 91 shown in FIG. 17 include thrust bearings receiving plates 96 (one shown in FIGS. 18(A) and 18(B)). Each thrust bearings receiving plate 96 is intervened between the ends of the roller 95 and retainer 99 and the end of the inner link plate 92. The intervention of this thrust bearings receiving plate 96 increases the contact area and the contact pressure is decreased when a thrust load is applied to the roller 95. Accordingly, wear of the retainer 99 and thrust bearings receiving plate 96 can be suppressed. Other points of the roller chain 91 are substantially the same as in the roller chain 11 shown in FIG. 1, and the operation and effects of the roller chain 91 are also substantially the same as in the roller chain 11. Thus, other explanation of the roller chain 91 is omitted.

Figure 20:
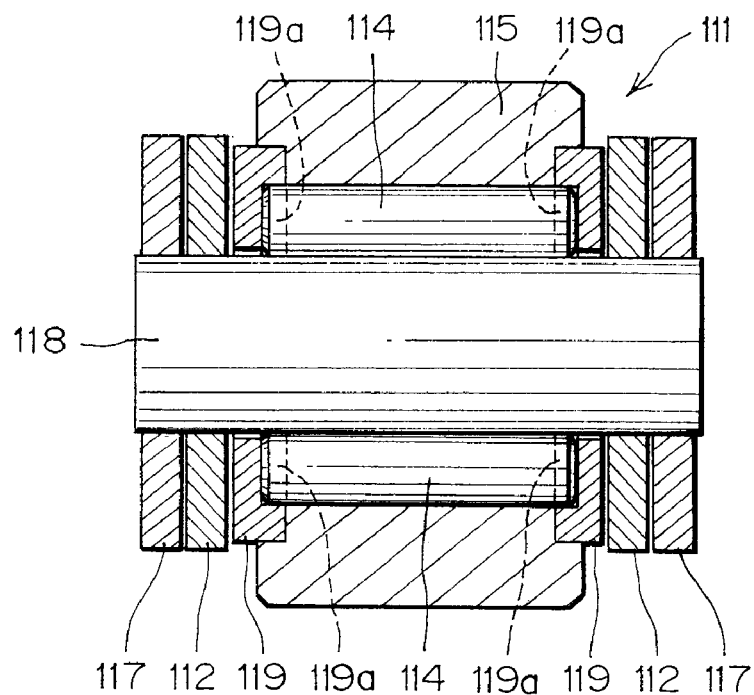
FIG. 20 is a cross-sectional view of a roller chain incorporating the roller bearings according to an embodiment 10 of the present invention.
Figure 21A:
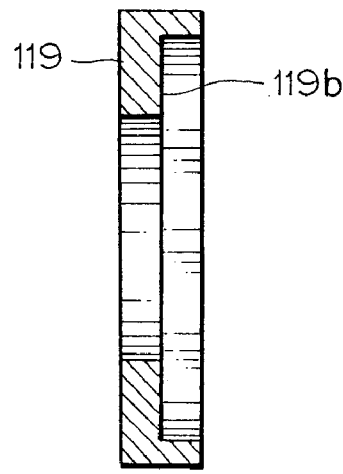
FIGS. 21(A) and 21(B) show a retainer used in the roller chain shown in FIG. 20, particularly.
Figure 21B:
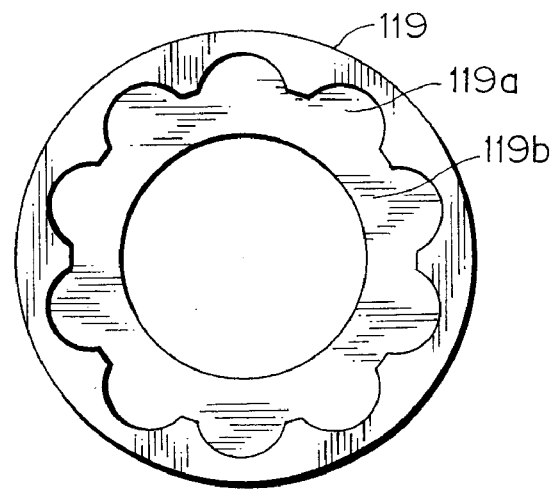

Embodiment 10 according to the present invention will be described with reference to FIG. 20 and FIGS. 21(A) and 21(B). FIG. 20 is a cross-sectional view of a roller chain incorporating the roller bearings according to Embodiment 10 of the present invention. FIGS. 21(A) and 21(B) show a retainer used in the roller chain shown in FIG. 20, particularly, FIG. 21(A) is a cross-sectional view of the retainer and FIG. 21(B) is a plan view thereof. A roller chain 111 shown in FIG. 20 is different from the roller chain 11 shown in FIG. 1 only in that the roller chain 111 in FIG. 20 is one where the bush 13 is not used in the roller chain 11 in FIG. 1, that is a bushless chain. That is, in the roller chain 111 shown in FIG. 20, a pair of outer link plates 117 is connected to both ends of a pin 118 onto which a pair of inner link plates 112 was fitted. A plurality of rollers 114, for example, 10 rollers 114 each are disposed on an outer periphery of the pin 118, and a roller 115 is attached so as to surround the rollers 114. Further, the space between the roller 115 and the pin 118 is filled with a lubricant such as grease or the like. In the roller chain 111, the roller 115 functions as an outer ring of the roller bearings, the rollers 114 function as a rolling body of the roller bearings and the pin 118 functions as an inner ring of the roller bearings. Therefore, the roller 115, the rollers 114 and the pin 118 constitute the roller bearings.

Further, as shown in FIG. 20, a substantially ring-shaped retainer 119 is disposed on each of both ends of the roller 115. As shown in FIGS. 21(A) and 21(B), the retainer 119 is substantially ring-shaped. Further, a recess portion 119b is formed on one side of each retainer 119 and a plurality of pockets 119a, in this Embodiment, 10 pockets each having a continuous semicircular shape in a plan view are formed continuously to the recess portion 119b. Each of the pockets 119a holds and guides an end of each roller 114. Other points of the roller chain 111 are substantially the same as in the roller chain 11 shown in FIG. 1, and the operation and effects of the roller chain 111 are also substantially the same as in the roller chain 11. Thus, other explanation of the roller chain 111 is omitted.

According to the present invention, the following effects can be obtained.

(1) Since the rollers can reliably be held and guided by means of the retainer, the roller bearings is smoothly rotated thereby to reduce the rolling resistance.

(2) Since sliding wear between the rollers is not generated, non lubrication and extension of the maintenance period can be realized.

(3) There occurs no contact between the rollers, or metal contact between end faces of the roller and the collar of the outer ring (roller), and the machining accuracy of the outer ring is enhanced. Accordingly, the low noise performance can be realized.

(4) Since there are no inward collars on both ends of the outer ring (roller), machining of the outer ring is very easy and the productivity of the outer ring is high. Further, the roller assembling capability is excellent since the retainer has pockets that receives the rollers for bearing so that the rollers do not fall down during the assembling thereof or the mistakes of numbering the rollers are not made.

(5) The contact area between the retainer and the outer ring and the contact area between the retainer and the inner link plate are increased and wear therebetween can be suppressed while the skew of the roller can be prevented. Accordingly, a performance of a thrust load is improved.

(6) Since the rollers are held and guided by means of the pockets, vibration in rolling is reduced.

(7) Since a part of each roller is held and guided from both sides by the pocket in the retainer, a skew is difficult to occur and the outer ring is rotated straight without snaking. Particularly, in the roller chain incorporating the roller bearings the stick-slip phenomenon and snaking is difficult to occur.

(8) The leak of a lubricant such as grease or the entry of dust from the outside can be prevented and a uniform and a suitable amount of lubricant such as grease or the like can be maintained between rollers for bearing for a long period of time. Thus, the use life of the roller bearings is improved.

(9) Since the retainer provided with pockets suitable for the rollers can be easily produced by injection molding, it can be produced inexpensively. Further, since the pockets that hold and guide the roller are separately placed, even if the length of the roller is varied, a kind of retainer can be adapted and it is not necessary to prepare many kinds of retainers.

Obviously, various minor changes and modifications of the present invention are possible in the light of the above teaching. It is therefore to be understood that within the scope of the appended claims, the present invention may be practiced otherwise than as specifically described.

What is claimed is:

1. A roller bearing comprising an inner ring and a surrounding outer ring in coaxial, spaced, relationship with each other about an axis of rotation, said outer ring having first and second ends, a plurality of rollers disposed between said outer ring and said inner ring, each roller being cylindrical, having first and second ends, and having a uniform diameter substantially from its first end to its second end, said diameter being equal to the spacing between said inner and outer rings, first and second substantially ring-shaped retainers disposed at the first and second ends of the outer ring respectively, each said retainer being unitary and at least one of the retainers comprising a recess having an axial interior wall and a radial interior wall, the radial wall facing, and being in engagement with, one of the ends of each of said rollers and limiting axial movement of said rollers, and a plurality of pockets formed on said radial interior wall, each said pocket receiving one of said ends of one of the rollers and preventing relative circumferential movement of said parts of the rollers around said axis of rotation.

2. Roller bearings according to claim 1, wherein the retainer is made of metal having wear resistance or resin having lubricating properties.

3. A roller bearing according to claim 1, wherein the shape of each of said pockets is semicircular, circular, oval, polygonal, or an arc conforming to the outer cylindrical surface of the roller received therein.

4. Roller bearings according to claim 1, wherein the pockets formed on both ends of the retainers are asymmetric.

5. Roller bearings according to claim 1, wherein the space between the outer ring and the inner ring is filled with a lubricant.

6. A roller chain comprising a plurality of sprocket-engaging rollers and a plurality of bushings, each bushing being surrounded by, and in coaxial, spaced, relationship with, one of said sprocket-engaging rollers about an axis of rotation, wherein each said sprocket-engaging roller has first and second ends and functions as an outer ring of a roller bearing, and each said bushing functions as an inner ring of a roller bearing, each said roller bearing comprising a plurality of bearing rollers disposed between its outer ring and its inner ring, each bearing roller being cylindrical, having first and second ends, and having a uniform diameter substantially from its first end to its second end, said diameter being equal to the spacing between said inner and outer rings, first and second substantially ring-shaped retainers disposed at the first and second ends of the outer ring respectively, each said retainer being unitary and at least one of the retainers comprising a recess having an axial interior wall and a radial interior wall, the radial wall facing, and being in engagement with, one of the ends of each of said bearing rollers and limiting axial movement of said bearing rollers, and a plurality of pockets formed on said radial interior wall, each said pocket receiving one of said ends of one of the bearing rollers and preventing relative circumferential movement if said parts of the bearing rollers around said axis of rotation.

7. A roller chain according to claim 6, wherein the retainer is made of metal having wear resistance or resin having lubricating properties.

8. A roller chain according to claim 6, wherein the shape of each of said pockets is semicircular, circular, oval, polygonal, or an arc conforming to the outer cylindrical surface of the roller received therein.

9. A roller chain according to claim 6, wherein the pockets formed on both ends of the retainers are asymmetric.

10. A roller chain according to claim 6, wherein the space between the outer ring and the inner ring is filled with a lubricant.

* * * * *

UNITED STATES PATENT AND TRADEMARK OFFICE
CERTIFICATE OF CORRECTION

PATENT NO.   : 6,742,935 B2
DATED        : June 1, 2004
INVENTOR(S)  : Tomoyuki Saji It is certified that error appears in the above-identified patent and that said Letters Patent is hereby corrected as shown below:

The Title page should be replaced with the attached title page.

The specification should be deleted to appear as per attached specification.

Signed and Sealed this

Sixth Day of September, 2005

JON W. DUDAS
*Director of the United States Patent and Trademark Office*

United States Patent
Saji

(10) Patent No.: US 6,742,935 B2
(45) Date of Patent: Jun. 1, 2004

(54) ROLLER BEARINGS AND CHAIN INCORPORATING THE ROLLER BEARINGS

(75) Inventor: Tomoyuki Saji, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/071,970

(22) Filed: Feb. 8, 2002

(65) Prior Publication Data

US 2002/0110297 A1 Aug. 15, 2002

(30) Foreign Application Priority Data

Feb. 9, 2001 (JP) ............................. 2001/034283

(51) Int. Cl.[7] ............................................. F16C 21/00
(52) U.S. Cl. ..................... 384/587; 384/127; 384/572
(58) Field of Search ............................ 384/127, 420, 384/469, 569, 587, 573, 572, 578, 579

(56) References Cited

U.S. PATENT DOCUMENTS

| 681,793 | A | | 9/1901 | Hutchinson | |
|---|---|---|---|---|---|
| 745,198 | A | * | 11/1903 | Klahn | 384/578 |
| 1,609,618 | A | * | 12/1926 | Gallagher et al. | 384/578 |
| 2,540,283 | A | * | 2/1951 | Parsons | 384/578 |
| 2,696,412 | A | * | 12/1954 | Blair | 384/578 |
| 3,206,263 | A | * | 9/1965 | Altson | 384/578 |
| 3,362,762 | A | | 1/1968 | Haller | |
| 3,711,911 | A | | 1/1973 | Schweitzer | |
| 4,915,511 | A | | 4/1990 | Kotegawa et al. | |
| 5,660,485 | A | * | 8/1997 | Podhajecki et al. | 384/572 |
| 5,743,659 | A | * | 4/1998 | Stewart | 384/573 |
| 5,823,686 | A | | 10/1998 | Murano et al. | |
| 6,102,573 | A | | 8/2000 | Morimoto et al. | |
| 6,179,474 | B1 | | 1/2001 | Podhajecki | |

FOREIGN PATENT DOCUMENTS

| JP | 64-4122 | 1/1987 |
|---|---|---|
| JP | 62004122 | 1/1987 |
| JP | 2-7219 | 1/1990 |
| JP | 2-145323 | 12/1990 |
| JP | 10-250817 | 9/1998 |
| JP | 11-240072 | 3/2001 |

* cited by examiner

*Primary Examiner*—David A. Bucci
*Assistant Examiner*—Colby Hansen
(74) *Attorney, Agent, or Firm*—Howson and Howson

(57) ABSTRACT

A roller chain incorporating the roller bearings wherein a plurality of rollers is disposed between a roller that functions as an outer ring and a bushing that functions as an inner ring comprises a substantially ring-shaped retainer disposed on both ends of the roller respectively. The retainer includes a plurality of pockets for guiding at least a part of each of the rollers on the inner side of the retainer.

10 Claims, 12 Drawing Sheets

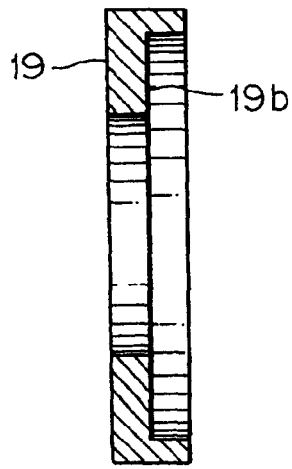
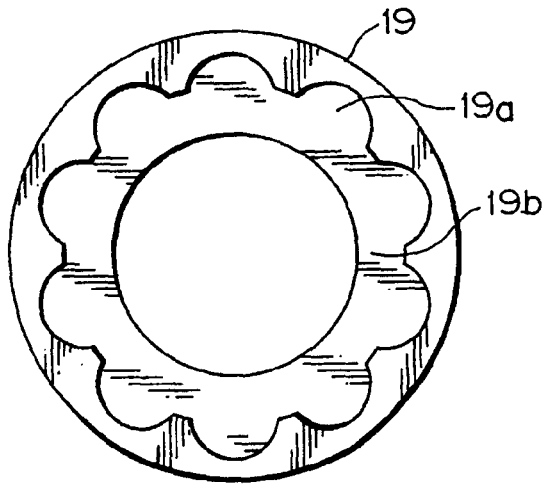

ROLLER BEARINGS AND CHAIN INCORPORATING THE ROLLER BEARINGS

BACKGROUND OF THE INVENTION

The invention relates to roller bearings and a roller chain incorporating the roller bearings.

Figure 22:
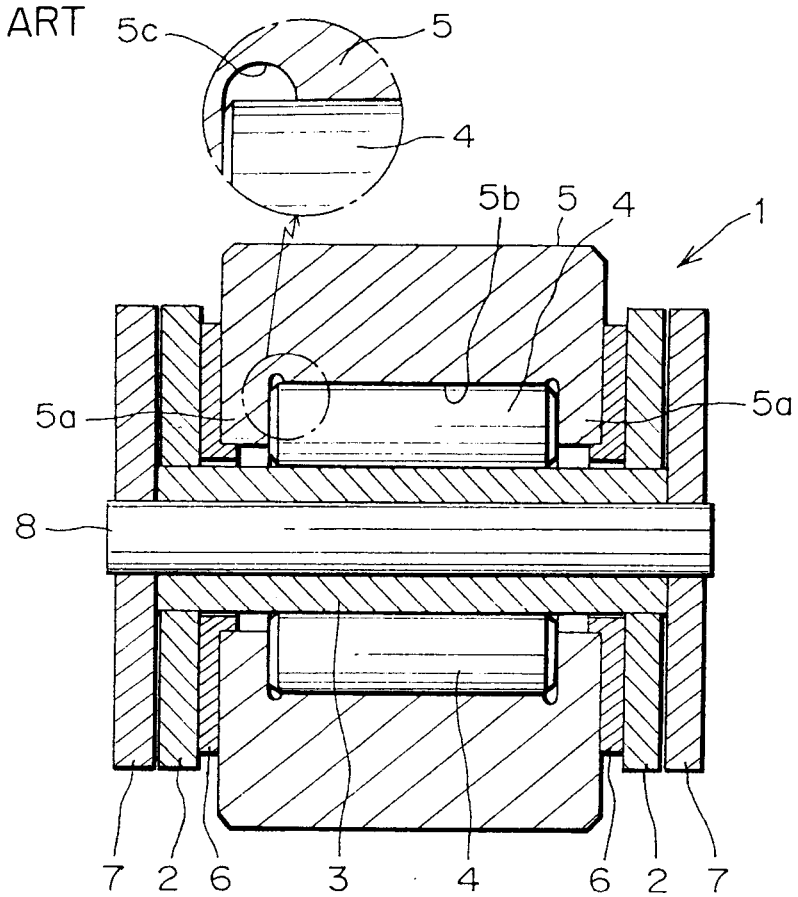
FIG. 22 is a cross-sectional view of a conventional roller chain.

FIG. 22 is a cross-sectional view of a conventional roller chain incorporating a roller bearing, as disclosed in Japanese Unexamined Patent Application, First Publication No. Sho. 62-4122 (Japanese Examined Patent Application, Second Publication No. Hei. 4-78523) In the roller chain 1 shown in FIG. 22, a plurality of rollers 4 is disposed on an outer periphery of a bushing 3 both of the ends of which are connected to a pair of inner link plates 2. A roller 5 is attached to the rollers 4 so as to surround the rollers 4, and a thrust bearings 6 intervene in the spaces between the roller 5 and the inner link plates 2. Further, a pair of outer link plates 7 is disposed outside the inner link plates 2, and the outer link plates 7 are connected to each other by a pin 8 that penetrates the bushing 3. Integrally formed on both ends of the roller 5 are inward collars 5a, which hold and guide the rollers 4. Further, the space between the roller 5 and the bushing 3 is filled with a lubricant such as grease or the like. In the roller chain 1, the roller 5 functions as an outer ring of the roller bearings, the plurality of rollers 4 functions as a rolling body of the roller bearings and the bushing 3 functions as an inner ring of the roller bearings. Therefore, the roller 5, the rollers 4 and the bushing 3 constitute the roller bearings.

Figure 23:
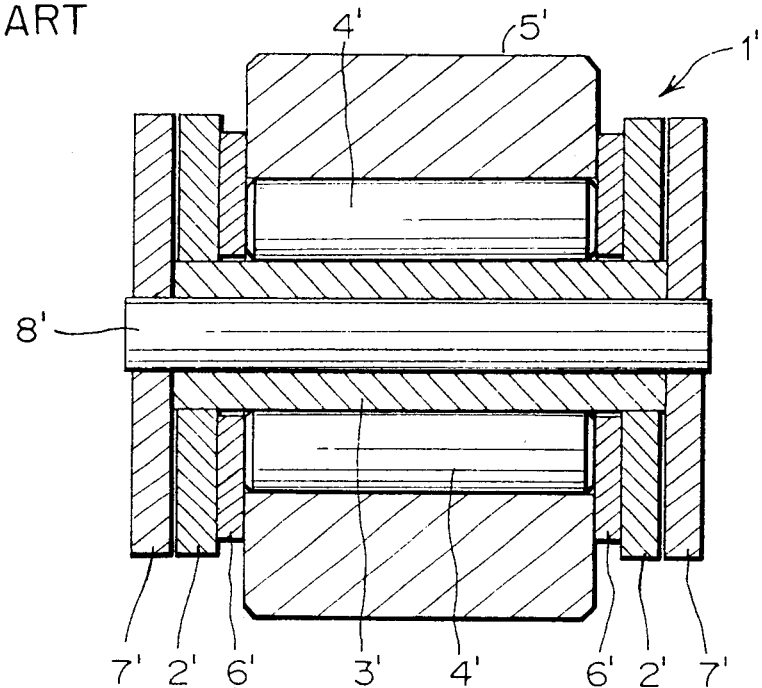
FIG. 23 is a cross-sectional view of another conventional roller chain.

FIG. 23 is a cross-sectional view of another conventional roller chain disclosed in Japanese Unexamined Utility Model Application, First Publication No. Hei. 2-7219 (Japanese Examined Utility Model Application, Second Publication No. Hei. 7-12327) In the roller chain 1' shown in FIG. 23 a plurality of rollers 4' is disposed on an outer periphery of a bushing 3' both ends of which are connected to a pair of inner link plates 2'. A roller 5' is attached to the rollers 4' so as to surround the rollers 4', and thrust bearing plates 6' intervene in spaces between the roller 5' and the inner link plates 2'. Further, a pair of outer link plates 7' is disposed outside the inner link plates 2' and the outer link plates 7' are connected to each other by means of a pin 8' that penetrates the bushing 3'. The roller 5' has no inward collars 5a on both ends of the roller 5', and therefore the inner and outer peripheries of the roller 5' are straight. The rollers 4' are held and guided between the pair of thrust bearing plates 6'. Further, the space between the roller 5' and the bushing 3' is filled with a lubricant such as grease or the like. In the roller chain 1', the roller 5' functions as an outer ring of the roller bearings, the plurality of rollers 4' functions as a rolling body of the roller bearings and the bushing 3' functions as an inner ring of the roller bearings. Therefore, the roller 5', the rollers 4' and the bushing 3' constitute the roller bearings.

Conventional roller bearings are offered in two types: a retainer incorporating type, and a type which does not utilize a retainer. The retainer that holds and guides the rollers generally has a pocket that holds and guides the rollers as a whole.

The roller chain 1 shown in FIG. 22 has the following problems:

(1) The rollers 4 are freely accommodated between the roller (outer ring) 5 and the bushing (inner ring) 3, and contact is generated between the rollers 4. Accordingly, wear is generated whereby smooth rotation of the roller 5 is suppressed.

(2) Collision noises are generated upon contact between the rollers 4, and repeated impact can generate fatigue fracture.

(3) When a thrust load is applied to the roller 5, a skew (the slanting of the rollers 4 with respect to the proper rotational axis) is generated, and the collar 5a rubs against the roller 4. Accordingly, the rollers 4 are locked at an early stage, resulting in suppression of smooth rotation of the roller 5.

(4) By sliding of the inner side of the collars 5a at both ends of the roller 5 on the end face of the roller 4 the collar 5a rubs against the roller 4, resulting in suppression of smooth rotation of the roller 5.

(5) Since it is difficult to enhance the surface roughness of the inner side of the collar 5a and difficult to perform heat-treatment in its manufacture, the rate of production of the roller 5 is low.

(6) Since the collars 5a, 5a are integrally formed on both ends of the roller 5, respectively, it is necessary to provide a clearance 5c (shown in an enlarged portion of FIG. 22) on a corner of a recess portion 5b in the roller 5 for preventing the interference with the roller 4. Accordingly, it takes much time to cut and grind the roller 5 and the rate of production of the roller 5 is low.

(7) In the assembly of the rollers 4 and the roller 5, the rollers 4 are first installed in the recess portion 5b of the roller 5, and then they must be assembled. Thus, there is no flexibility, and the rollers 4 may fall away, which impairs the assembly process.

The roller chain 1' shown in FIG. 23 has the following problems:

(8) Since the roller (outer ring) 5' has no an inward collar, the contact area between the roller 5' and the thrust bearing plates 6' is small and a thrust load applied to the roller 5' is received locally by the thrust bearing plates 6'. Thus, the wear of the thrust bearing plates 6' tends to progress.

(9) Since the roller 5' and the thrust bearing plates 6' are completely independent of each other, the thrust bearing plates 6' cannot limit skew generated in the rollers 4', and the skew is easily generated.

(10) A gap is produced between the roller 5' and the thrust bearing plates 6'. Thus, a lubricant such as grease or the like easily leaks to the outside and is exhausted, so that the wear between the roller 5' and the thrust bearing plates 6' rapidly progresses. Further, outside dust particles easily enter through the gap and deterioration of lubricant and wear are promoted.

Further, in a general roller bearing in which the above-mentioned retainer was incorporated, the retainer has a pocket that holds and guides the rollers 4 as a whole. Accordingly, the following problems occur:

(11) Since each pocket embraces the rollers 4 as a whole, the space between the rollers 4 is small, and since the retainer is complex, the lubricant such as grease or the like cannot be uniformly held in the roller bearings and the lubricant capacity is also small.

(12) The pocket that holds the rollers as a whole must be machined accurately, and the production of the retainer is difficult and very expensive.

(13) Even when each roller bearing is of the same diameter, if the length of the roller is changed, a retainer having a pocket corresponding the changed length is needed. Thus, a large number of types of retainers must be kept and parts management is difficult and costly.

SUMMARY OF THE INVENTION

It is, accordingly, a general object of the invention to provide roller bearings in which there is no contact between the rollers, lubricant can be held sufficiently, skew is not generated easily, and the roller bearings have a strong resistance to thrust load and sealing properties.

Another object of the invention is to provide improved production and assembly of roller bearings.

Another object of the invention is to provide a roller chain incorporating roller bearings, in which there is no contact between the rollers, lubricant can be held sufficiently, skew is not generated easily, and in which the roller bearings have a strong resistance to thrust load and sealing properties.

Still another object of the invention is to provide improved production and assembly of a roller chain incorporating roller bearings.

According to one aspect of the invention, there is provided roller bearings wherein a plurality of rollers is disposed between an outer ring and an inner ring, comprising substantially ring-shaped retainers disposed on both ends of the outer ring respectively, at least one of the retainers including a plurality of pockets for guiding at least a part of each of the rollers on the inner side of the retainer.

According to another aspect of the invention, a roller chain incorporates roller bearings wherein a plurality of rollers are disposed between a roller that functions as an outer ring and a bushing that functions as an inner ring, and comprises a substantially ring-shaped retainer disposed on both ends of the roller respectively, the retainer including a plurality of pockets for guiding at least a part of each of rollers on the inner side of the retainer.

According to still another aspect of the invention, a roller chain incorporates roller bearings wherein a plurality of rollers are disposed between a roller that functions as an outer ring and a pin that functions as an inner ring, and comprises a substantially ring-shaped retainer disposed on both ends of the roller respectively, the retainer including a plurality of pockets for guiding at least a part of each of the rollers on the inner side of the retainer.

In the above-mentioned aspects of the invention, the retainer is preferably made of metal having wear resistance, such as copper alloy or oleo-sintered alloy or resin having lubricating properties. Further, the retainer may be subjected to processing such as heat treatment, changing surface roughness, and formation of a number of pits with shot or a WPC to improve wear resistance of the retainer.

It is preferable that the pockets are formed on the retainer for at least one side of the roller. If the number of the pockets is further increased, the effects of the pockets can be obtained. One or more rollers can be guided by one pocket.

Further, in the above-mentioned aspect of the invention, preferably, the shape of the pocket is semicircular, circular, oval, polygonal, or similar to the end face of the roller. The pockets formed on both ends of the retainers may be asymmetric. The size of the pocket is not particularly limited, but a pocket having a diameter equal to or greater than the diameter of the roller can be rotated smoothly. Further, even if the pocket does not cover the whole outer periphery of the roller, if a part of the pocket comes into contact with the roller and can guide the roller, the pocket can be used. Further, the pocket may even be connected independently to the rollers and the shapes of the pockets are not necessarily the same.

Further, it is preferable that the space between the outer ring and the inner ring is filled with a lubricant such as grease. However, even in a case where a lubricant such as grease or the like cannot be used, sliding between rollers does not occur. Thus, the chain roller, or chain, of the invention can be used without a lubricant. Further, if heat-resisting material is used as the retainer, the roller chain or chain of the invention can be used at a high temperature.

According to still another aspect of the invention roller bearing-incorporting chain comprises a plurality of rollers disposed between a bushing that functions as an outer ring and a pin that functions as an inner ring. Engagement holes for the respective rollers are formed along the respective central axes of the rollers; and substantially ring-shaped retainers are disposed on both ends of the roller respectively, the retainers including guide portions for rotatably guiding the rollers while engaged in the engagement holes of the rollers. Further, the invention can be applied to a roller-incorporating cam follower and a roller follower.

According to the invention, when the outer ring (roller) is rotated, a roller that contacts an inner periphery of the outer ring is automatically rotated and rolling contact occurs. A retainer that guides the roller is rotated around an inner ring (a bushing or a pin) by this automatic rotation of the roller. Then, since the roller is guided by the retainer, contact and wear between the rollers are not generated and collision noises do not occur. Further, since there is a certain gap or space between the rollers, a lubricant such as grease or the like can be maintained uniformly and in an appropriate amount. Further, a clearance is provided to improve abrasion resistance despite the intrusion of abrasive powder, dust particles and the like from outside. The direction of rotation of the retainer is the same as that of the outer ring. Thus, a roller is guided regularly between the outer ring (roller) and the inner ring (bushing or pin) and the outer ring rotates smoothly.

Since the pocket that guides the roller does not strongly grasp or fix the roller, a slight slippage between the roller and the retainer occurs according to the rotation of the roller. However, abrasion of the roller and the retainer is minimal. Further, although the radial load acts on the outer ring, the roller and the inner ring, it does not act on the retainer at all. Accordingly, the retainer is not abraded or broken by the radial load.

The number of rotations of the retainer is about half the number of rotations of the outer ring, irrespective of the diameter and the radius of revolution of the roller. Therefore, since the retainer is rotated at a rate lower than the rate of rotation of the outer ring, when the outer roller receives a thrust load, sliding speeds of the retainer and the inner link plate are decreased. Thus, the wear of the retainer can be suppressed.

BRIEF DESCRIPTION OF THE DRAWINGS

Preferred embodiments of the invention will now be described in detail, by way of example only, with reference to the accompanying drawings, in which:

FIG. 1 is a cross-sectional view of a roller chain incorporating the roller bearings according to a first embodiment of the invention;

FIGS. 2(A) and 2(B) show a retainer used in the roller chain shown in FIG. 1. Particularly, FIG. 2(A) is a cross-sectional view thereof, and FIG. 2(B) is a plan view thereof;

FIG. 3 is a cross-sectional view of a roller chain incorporating the roller bearings according to a second embodiment of the invention;

FIG. 4 is a plan view of a retainer used in the roller chain shown in FIG. 3;

FIG. 5 is a cross-sectional view of a roller chain incorporating the roller bearings according to a third embodiment of the invention;

FIGS. 6(A) and 6(B) are plan views of a retainer used in the roller chain shown in FIG. 5. Particularly, FIG. 6(A) is a plan view of one retainer, and FIG. 6(B) is a plan view of the other retainer;

FIG. 7 is a cross-sectional view of a roller chain incorporating the roller bearings according to a fourth embodiment of the invention;

FIGS. 8(A), 8(B) and 8(C) are enlarged views of the circle D in FIG. 7. Particularly, FIG. 8(A) shows a structure where a labyrinth was formed between the roller and the retainer, FIG. 8(B) shows a structure where ring-shaped grooves were formed on the retainer, and FIG. 8(C) shows a structure where a seal ring was disposed between the roller and the retainer;

FIG. 9 is a cross-sectional view for explaining the size of the roller chain shown in FIG. 7;

FIG. 10 is a cross-sectional view of a roller chain incorporating the roller bearings according to a fifth embodiment of the invention;

FIG. 11 is a cross-sectional view of a roller chain incorporating the roller bearings according to a sixth embodiment of the invention;

FIGS. 12(A) and 12(B) show a retainer used in the roller chain shown in FIG. 11. Particularly, FIG. 12(A) is a cross-sectional view thereof, and FIG. 12(B) is a plan view thereof;

FIG. 13 is a cross-sectional view of a roller chain incorporating the roller bearings according to a seventh embodiment of the invention;

FIGS. 14(A) and 14(B) show a retainer used in the roller chain shown in FIG. 13. Particularly, FIG. 14(A) is a cross-sectional view thereof, and FIG. 14(B) is a plan view thereof;

FIG. 15 is a cross-sectional view of a roller chain incorporating the roller bearings according to an eighth embodiment of the invention;

FIG. 16 is a plan view of a retainer used in the roller chain shown in FIG. 15;

FIG. 17 is a cross-sectional view of a roller chain incorporating the roller bearings according to a ninth embodiment of the invention;

FIGS. 18(A) and 18(B) show a thrust bearings receiving plate used in the roller chain shown in FIG. 17. Particularly, FIG. 18(A) is a cross-sectional view thereof, and FIG. 18(B) is a plan view thereof;

FIGS. 19(A) and 19(B) show a retainer used in the roller chain shown in FIG. 17. Particularly, FIG. 19(A) is a cross-sectional view thereof, and FIG. 19(B) is a plan view thereof;

FIG. 20 is a cross-sectional view of a roller chain incorporating the roller bearings according to a tenth embodiment of the invention;

FIGS. 21(A) and 21(B) show a retainer used in the roller chain shown in FIG. 20. Particularly, FIG. 21(A) is a cross-sectional view thereof, and FIG. 21(B) is a plan view thereof;

FIG. 22 is a cross-sectional view of a conventional roller chain; and

FIG. 23 is a cross-sectional view of another conventional roller chain.

DETAILED DESCRIPTION OF THE PREFERRED EMBODIMENTS

The following description is merely exemplary in nature and is in no way intended to limit the invention or its application or uses.

The first embodiment of the invention will be described with reference to FIG. 1 and FIGS. 2(A) and 2(B). FIG. 1 is a cross-sectional view of a roller chain incorporating the roller bearings according to the first embodiment of the invention. FIGS. 2(A) and 2(B) show a retainer used in the roller chain shown in FIG. 1. Particularly, FIG. 2(A) is a cross-sectional view of the retainer, and FIG. 2(B) is a plan view thereof. In a roller chain 11 shown in FIG. 1, a plurality of rollers 14, for example ten rollers 14, are disposed on the outer periphery of a bushing 13, both ends of which are connected to a pair of inner link plates 12. A roller 15 is attached so as to surround the rollers 14. Further, a pair of outer link plates 17 is disposed outside the inner link plates 12, and the outer link plates 17 are connected to each other by a pin 18 that penetrates the bushing 13. Further, the space between the roller 15 and the bushing 13 is filled with a lubricant such as grease or the like. In the roller chain 11, the roller 15 functions as an outer ring of the roller bearings, the plurality of rollers 14 function as a rolling body of the roller bearings and the bushing 13 functions as an inner ring of the roller bearings. Therefore, the roller 15, the rollers 14 and the bushing 13 constitute the roller bearing.

Further, as shown in FIG. 1, a substantially ring-shaped retainer 19 is disposed on each of both ends of the roller 15. As shown in. FIG. 2(A) and FIG. 2(B), the retainer 19 is substantially ring-shaped, and a recess portion 19b is formed on one side of the retainer 19. Further, a plurality of semicircular pockets 19a, in this Embodiment ten pockets, is formed in this recess portion 19b. The pockets 19a hold and guide the respective ends of the rollers 14.

In the roller chain 11 shown in FIG. 1, when the roller 15 is rotated, the roller 14 in contact with an inner periphery of the roller 15 is rotated, whereby a rolling contact is generated. By the rotation of this roller 14, the retainer 19 that guides the rollers 14 is rotated around the bushing 13. Then, since the all ten of the rollers 14 are guided by the left and right pockets 19a, contact and wear between the rollers 14 are avoided, and collision noises do not occur. Further, there is a certain gap between the rollers 14, and a lubricant such as grease can be held therein in an appropriate amount and uniformly. Further, since the roller chain 11 maintains a clearance space, against intruders wear caused by abrasive powder, dust particles, and the like, which enter from outside, is reduced and wear resistance is improved. The direction of rotation of the retainer 19 is the same as that of the roller 15. Accordingly, the roller 14 is regularly guided between the roller 15 and the bushing 13 so that the roller 15 rotates smoothly.

Since the pocket 19a that guides the roller 14 does not firmly grasp or fix the roller 14, a slight sliding occurs between the roller 14 and the retainer 19 as the roller 14 rotates. However, abrasion of the roller 14 and the retainer 19 is minimized. Further, although the radial load acts on the roller 15, the roller 14 and the bushing 13, it does not act on the retainer 19 at all. Accordingly, the retainer 19 is not abraded or broken by the radial load.

The number of rotations of the retainer 19 is about half of the number of rotations of the roller 15 irrespective of the diameter and the radius of revolution of the roller 14. Therefore, since the retainer 19 rotates less than the roller 15, when the roller 15 receives a thrust load, the speed of sliding of the retainer 19 relative to the inner link plate 12 is decreased. Thus, wear of the retainer 19 can be suppressed.

Further, in the roller chain 11, the roller 15 has no collar and is very easy to machine. Thus, production of the roller 15 is improved. Further, during assembly, the roller chain 11 the rollers 14 are easily inserted into the roller 15, and the rollers 14, which fit into the pockets 19a, do not fall out. Thus, assembly of the roller chain 11 is also improved.

The second embodiment according to the invention will be described with reference to FIG. 3 and FIG. 4. FIG. 3 is a cross-sectional view of a roller chain incorporating the roller bearings according to the second embodiment of the invention. FIG. 4 is a plan view of a retainer used in the roller chain shown in FIG. 3. In the roller chain 21 shown in FIG. 3, five rollers 24 and five rollers 24' are alternately disposed on the outer periphery of a bushing 23, both ends of which are connected to a pair of inner link plates 22. A roller 25 is attached so as to surround the five rollers 24 and the five rollers 24'. Further, a pair of outer link plates 27 is disposed outside the inner link plates 22 and the outer link plates 27 are connected to each other by a pin 28 that penetrates the bushing 23. Further, the space between the roller 25 and the bushing 23 is filled with a lubricant such as grease or the like. In the roller chain 21, the roller 25 functions as an outer ring of the roller bearing, the plurality of rollers 24, 24' functions as a rolling body of the roller bearings, and the bushing 23 functions as an inner ring of the roller bearing. Therefore, the roller 25, the rollers 24, 24' and the bushing 23 constitute the roller bearing.

Further, as shown in FIG. 3, a substantially ring-shaped retainer 29 is disposed on each of both ends of the roller 25. As shown in FIG. 4, the retainer 29 is substantially ring-shaped, and a recess portion 29b is formed on one side of the retainer 29. Further, a plurality of semicircular pockets 29a, in this embodiment five pockets, are formed in this recess portion 29b. The five pockets 29a hold and guide the respective ends of the rollers 24, as shown in FIG. 3. The rollers 24', disposed between the rollers 24, are shorter in length than the rollers 24, each end of which is held and guided by the pocket 29a. Therefore, the shorter rollers 24' are not held and guided by the pockets 29a.

As described above, in the roller chain 21 shown in FIG. 3, the rollers 24' having shorter roller length are used. Thus, as shown in Japanese Patent Application No. Hei. 12-240072, which is a prior application, when a thrust load is applied to the roller (outer ring) 25, a circumferential gap between the shorter rollers 24' and the rollers 24 removes the skew so that the rotation of the roller 25 is stabilized and wear of the retainer 29 can be suppressed. Other features of the roller chain 21 are substantially the same as those of the roller chain 11 shown in FIG. 1, and the operation and effects of the roller chain 21 are also substantially the same as those of the roller chain 11. Thus, further explanation of the roller chain 21 is omitted.

The third embodiment of the invention will be described with reference to FIG. 5 and FIGS. 6(A) and 6(B). FIG. 5 is a cross-sectional view of a roller chain incorporating the roller bearings according to the third embodiment of the invention. FIGS. 6(A) and 6(B) are plan views of a retainer used in the roller chain shown in FIG. 5, particularly, FIG. 6(A) is a plan view of one retainer, and FIG. 6(B) is a plan view of the other retainer. In a roller chain 31 shown in FIG. 5, a plurality of rollers 34, for example, ten rollers 34, is disposed on the outer periphery of a bushing 33 both ends of which are connected to a pair of inner link plates 32. A roller 35 is attached so as to surround the rollers 34. Further, a pair of outer link plates 37 is disposed outside the inner link plates 32, and the outer link plates 37 are connected to each other by a pin 38 that penetrates the bushing 33. Further, the space between the roller 35 and the bushing 33 is filled with a lubricant such as grease or the like. In the roller chain 31, the roller 35 functions as an outer ring of the roller bearing, the plurality of rollers 34 functions as a rolling body of the roller bearing and the bushing 33 functions as an inner ring of the roller bearing. Therefore, the roller 35, the rollers 34 and the bushing 33 constitute the roller bearing.

Further, as shown in FIG. 5, a substantially ring-shaped retainer 39 is disposed on each of both ends of the roller 35. As shown in FIG. 6(A) and FIG. 6(B), the retainer 39 is substantially ring-shaped, and a recess portion 39b is formed on one side of the retainer 39. Further, a plurality of semicircular pockets 39a, in this Embodiment five pockets, is formed in this recess portion 39b. The pockets 39a hold and guide the respective ends of the rollers 34. Although this retainer 39 has the same shape as the retainer 29 shown in FIG. 4, the left retainer 39 and the right retainer 39 have the positions or phases of their respective pockets 39a shifted by 36 degrees, as shown in FIG. 6(A) and 6(B). That is, both retainers 39 are not symmetrical with respect to a vertical line. Therefore, as shown in FIG. 5, one end of each roller 34 is guided by a pocket 39a, but the other end thereof is not guided by a pocket 39a. Other features of the roller chain 31 are substantially the same as those of the roller chain 11 shown in FIG. 1, and the operation and effects of the roller chain 31 are also substantially the same as those of the roller chain 11. Thus, further explanation of the roller chain 31 is omitted.

The fourth embodiment of the invention will be described with reference to FIG. 7, FIGS. 8(A), 8(B) and 8(C) and FIG. 9. FIG. 7 is a cross-sectional view of a roller chain incorporating the roller bearings according to the fourth embodiment of the invention. FIGS. 8(A), 8(B) and 8(C) are enlarged views of a portion in FIG. 7 designated by the letter "D". Particularly, FIG. 8(A) shows a D portion, in which a labyrinth R is formed between the roller 45 and the retainer 49. FIG. 8(B) shows a D portion in which annular shaped grooves 49g are formed on the retainer 49. FIG. 8(C) shows a D portion in which a seal ring 49s is disposed between the roller 45 and the retainer 49. FIG. 9 is a cross-sectional view of a roller chain for explaining the sizes and lengths associated with the roller chain shown in FIG. 7. In a roller chain 41 shown in FIG. 7, a plurality of rollers 44, for example, ten rollers 44, is disposed on the outer periphery of a bushing 43, both ends of which are connected to a pair of inner link plates 42. A roller 45 is attached so as to surround the rollers 44. Further, a pair of outer link plates 47 is disposed outside the inner link plates 42, and the outer link plates 47 are connected to each other by a pin 48 that penetrates the bushing 43. Further, the space between the roller 45 and the bushing 43 is filled with a lubricant such as grease or the like. In the roller chain 41, the roller 45 functions as an outer ring of the roller bearing, the plurality of rollers 44 function as a rolling body of the roller bearing and the bushing 43 functions as an inner ring of the roller bearing. Therefore, the roller 45, the rollers 44 and the bushing 43 constitute the roller bearing.

Further, as shown in FIG. 7, a substantially ring-shaped retainer 49 is disposed on each of both ends of the roller 45. As shown in FIG. 7 and FIGS. 8(A), 8(B) and 8(C), the retainer 49 is substantially ring-shaped. Further, a plurality of pockets 49a, in this embodiment, ten pockets, is formed in one side of the retainer 49. The pockets 49a hold and guide the respective ends of the rollers 44.

The roller chain 41 shown in FIG. 7 enhances sealing properties by providing sealing means between the roller 45 and the retainer 49. In the roller chain 41 shown in FIG. 7, there is a small gap between the roller 45 and the retainer 49 as shown in FIGS. 8(A), 8(B) and 8(C). When the roller 45 rotates, the retainer 49 rotates simultaneously in the same direction but by a different numbers of revolutions. The enlarged portion shown in FIG. 8(A) shows a structure in which a labyrinth R was formed between the roller 45 and the retainer 49 as sealing means. Further, the enlarged portion shown in FIG. 8(B) shows a structure in which three annular grooves 49g were formed on the outer periphery of the retainer 49 as sealing means. These annular grooves 49g are filled with grease. Further, the enlarged portion shown in FIG. 8(C) shows a structure in which a seal ring 49s, such as an O ring or the like, is disposed between the roller 45 and the retainer 49 as a sealing means. By providing these sealing means, leakage of the lubricant such as grease or the like from the small gap between the roller 45 and the retainer 49 to the outside can be prevented, and the entry of dust particles from the outside can also be prevented.

The sizes and lengths associated with the roller chain 41 shown in FIG. 7 will be explained. As shown in FIG. 9, the distance L by which the retainer 49 overlaps the roller 45 is set longer than the sum (S1+S2) of the gaps between the retainers 49 and the inner link plates 42, so that the retainers 49 cannot fall out of the roller 45. In this case, the length of the roller 44 is set so that the roller 44 does not come out of the pocket 49a. Other features of the roller chain 41 are substantially the same as those of the roller chain 11 shown in FIG. 1, and the operation and effects of the roller chain 41 are also substantially the same as those of the roller chain 11. Thus, further explanation of the roller chain 41 is omitted.

The fifth embodiment of the invention will be described with reference to FIG. 10. FIG. 10 is a cross-sectional view of a roller chain incorporating the roller bearings according to the fifth embodiment of the invention. In a roller chain 51 shown in FIG. 10 two rows of rollers 54, 54, having, for example, ten rollers each, are disposed on the outer periphery of a bushing 53 both ends of which are connected to a pair of inner link plates 52. A roller 55 is attached so as to surround the two rows of rollers 54, 54. Further, a pair of outer link plates 57 is disposed outside the inner link plates 52, and the outer link plates 57 are connected to each other by a pin 58 that penetrates the bushing 53. Further, the space between the roller 55 and the bushing 53 is filled with a lubricant such as grease or the like. In the roller chain 51, the roller 55 functions as an outer ring of the roller bearing, the two rows of rollers 54, 54 function as a rolling body of the roller bearing, and the bushing 53 functions as an inner ring of the roller bearing. Therefore, the roller 55, the two rows of rollers 54, 54 and the bushing 53 constitute the roller bearing. Lengths of two rows of rollers 54, 54 may be the same or different from each other.

Further, as shown in FIG. 10, a substantially ring-shaped retainer 59 is disposed on each of both ends of the roller 55. The retainer 59 is substantially ring-shaped. Further, a plurality of pockets 59a, in this embodiment, ten pockets, is formed in one side of the retainer 59. And the plurality of pockets 59a hold and guide the respective ends of the rollers 54.

The left and right retainers 59, 59 each guide one end of each row of the rollers 54 and can be rotated individually. Further, a partition 60 intervenes between the respective rows of rollers 54, 54, and the left and right rows of rollers 54, 54 do not interfere with each other. Thus, further smooth rotation can be maintained. Then, even in a case where a very large thrust load is applied to the roller 55 and one retainer 59 is pressed between the roller 55 and the inner link plate 52, thereby causing rotation to become difficult, the radial load applied to the roller 55 is supported by the row of rollers that the other retainer 59 guides, so that smooth rotation can be maintained. Other features of the roller chain 51 are substantially the same as those of the roller chain 11 shown in FIG. 1, and the operation and effects of the roller chain 51 are also substantially the same as those of the roller chain 11. Thus, further explanation of the roller chain 51 is omitted.

The sixth embodiment of the invention will be described with reference to FIG. 11 and FIGS. 12(A) and 12(B). FIG. 11 is a cross-sectional view of a roller chain incorporating the roller bearings according to the sixth embodiment of the invention. FIGS. 12(A) and 12(B) show a retainer used in the roller chain shown in FIG. 11. Particularly, FIG. 12(A) is a cross-sectional view thereof and FIG. 12(B) is a plan view thereof. In a roller chain 61 shown in FIG. 11, a plurality of rollers 64, for example, ten rollers 64 each, is disposed on the outer periphery of a bushing 63, both ends of which are connected to a pair of inner link plates 62, and a roller 65 is attached so as to surround the rollers 64. The roller 65 has inner and outer peripheries, each having a straight cylindrical shape. Further, a pair of outer link plates 67 is disposed outside the inner link plates 62, and the outer link plates 67 are connected to each other by a pin 68 that penetrates the bushing 63. Further, the space between the roller 65 and the bushing 63 is filled with a lubricant such as grease or the like. In the roller chain 61, the roller 65 functions as an outer ring of the roller bearing, the rollers 64 function as a rolling body of the roller bearing and the bushing 63 functions as an inner ring of the roller bearing. Therefore, the roller 65, the rollers 64 and the bushing 63 constitute the roller bearing.

Further, as shown in FIG. 11, a substantially ring-shaped retainer 69 is disposed on each of both ends of the roller 65. As shown in FIGS. 12(A) and 12(B), the retainer 69 is substantially ring-shaped. Further, a plurality of pockets 69a, in this embodiment, ten pockets, each having a rectangular shape in plan view is formed in one side of the retainer. The respective pockets 69a hold and guide the respective ends of the rollers 64. Other features of the roller chain 61 are substantially the same as those of the roller chain 11 shown in FIG. 1, and the operation and effects of the roller chain 61 are also substantially the same as those of the roller chain 11. Thus, further explanation of the roller chain 61 is omitted.

The seventh embodiment of the invention will be described with reference to FIG. 13 and FIGS. 14(A) and 14(B). FIG. 13 is a cross-sectional view of a roller chain incorporating the roller bearings according to the seventh embodiment of the invention. FIGS. 14(A) and 14(B) show a retainer used in the roller chain shown in FIG. 13. Particularly, FIG. 14(A) is a cross-sectional view thereof, and FIG. 14(B) is a plan view thereof. In a roller chain 71 shown in FIG. 13, a plurality of rollers 74, for example, ten rollers 74, is disposed on the outer periphery of a bushing 73 both ends of which are connected to a pair of inner link plates 72. A roller 75 is attached so as to surround the rollers 74. The roller 75 has inner and outer peripheries, each having a straight cylindrical shape. Further, a pair of outer link plates 77 is disposed outside the inner link plates 72 and the outer link plates 77 are connected to each other by a pin 78 that penetrates the bushing 73. Further, the space between the roller 75 and the bushing 73 is filled with a lubricant such as grease or the like. In the roller chain 71, the roller 75 functions as an outer ring of the roller bearing, the rollers 74 function as a rolling body of the roller bearing, and the bushing 73 functions as an inner ring of the roller bearing. Therefore, the roller 75, the rollers 74 and the bushing 73 constitute the roller bearing.

Further, as shown in FIG. 13, a substantially ring-shaped retainer 79 is disposed on each of both ends of the roller 75. As shown in FIGS. 14(A) and 14(B), the retainer 79 is substantially ring-shaped. Further, a plurality of pockets 79a, in this embodiment, ten pockets, each having a rectangular shape in plan view, is formed in one side of the retainer 79. The respective pockets 79a hold and guide the respective ends of the rollers 74.

Each pocket 79a is deeper compared with the pockets 69a shown in FIG. 11 and FIGS. 12(A) and 12(B). In this case, as long as the end faces of the retainers 79 facing each other do not contact each other, the depth of the pocket 79a may be increased. Further, the depths of the pockets 79a facing each other are not necessarily the same. If the depth of the pocket 79a is decreased, a space around the roller 74 is increased accordingly, and the space that holds a lubricant such as grease or the like is increased, whereby the lubricant can be held in a sufficient amount and uniformly. Further, since the roller chain 71 has a clearance space wear due to intrusion of abrasive powder, dust particles, and the like, which enter from the outside, is reduced, and wear resistance is improved. On the other hand, if the depth of the pocket 79a is increased, the strength of the pocket 79a that guides the roller 74 is increased. Further, since it is difficult to cause the the roller 74 to incline, skew is prevented, and the roller 74 can be guided reliably. The connection of the opposed end faces of the retainers 79 makes the left and right retainers integral and skew is more reliably prevented. Other features of the roller chain 71 are substantially the same as those of the roller chain 11 shown in FIG. 1, and the operation and effects of the roller chain 71 are also substantially the same as those of the roller chain 11. Thus, further explanation of the roller chain 71 is omitted.

The eighth embodiment of the invention will be described with reference to FIG. 15 and FIG. 16. FIG. 15 is a cross-sectional view of a roller chain incorporating the roller bearings according to the eighth embodiment of the invention. FIG. 16 is a plan view of a retainer used in the roller chain shown in FIG. 15. In the roller chain 81 shown in FIG. 15, a plurality of rollers 84, for example, ten rollers 84 is disposed on the outer periphery of a bushing 83 both ends of which are connected to a pair of inner link plates 82. A roller 85 is attached so as to surround the rollers 84. Each of the rollers 84 has small diameter portions 84a on both ends. The roller 85 has inner and outer peripheries each having a straight, cylindrical shape. Further, a pair of outer link plates 87 is disposed outside the inner link plates 82 and the outer link plates 87 are connected to each other by a pin 88 that penetrates the bushing 83. Further, the space between the roller 85 and the bushing 83 is filled with a lubricant such as grease or the like. In the roller chain 81, the roller 85 functions as an outer ring of the roller bearing, the rollers 84 function as a rolling body of the roller bearing and the bushing 83 functions as an inner ring of the roller bearing. Therefore, the roller 85, the rollers 84 and the bushing 83 constitute the roller bearing.

Further, as shown in FIG. 15, a substantially ring-shaped retainer 89 is disposed on each of both ends of the roller 85. As shown in FIG. 16, the retainer 89 is substantially ring-shaped. Further, a plurality of pockets 89a, in this embodiment, ten pockets, that hold and guide small diameter portions 84a of the rollers 84, is formed on one side. Since each diameter of the pockets 89a is formed to be the same as that of the small diameter portion 84a, the whole small diameter portion 84a of the roller 84 can be held and guided. Thus, inclination of the roller 84 is difficult, and, as a result, skew is prevented, and the roller 84 can be guided reliably.

Other features of the roller chain 81 are substantially the same as those of the roller chain 11 shown in FIG. 1, and the operation and effects of the roller chain 81 are also substantially the same as those of the roller chain 11. Thus, further explanation of the roller chain 81 is omitted.

The ninth embodiment of the invention will be described with reference to FIG. 17, FIGS. 18(A) and 18(B) and FIGS. 19(A) and 19(B). FIG. 17 is a cross-sectional view of a roller chain incorporating the roller bearing according to the ninth embodiment of the invention. FIGS. 18(A) and 18(B) show a thrust bearings receiving plate used in a roller chain shown in FIG. 17. Particularly, FIG. 18(A) is a cross-sectional view of the thrust bearing plate and FIG. 18(B) is a plan view thereof. FIGS. 19(A) and 19(B) show a retainer used in the roller chain shown in FIG. 17. Particularly, FIG. 19(A) is a cross-sectional view of the retainer and FIG. 19(B) is a plan view thereof. In the roller chain 91 shown in FIG. 17, a plurality of rollers 94, for example, ten rollers 94 is disposed on the outer periphery of a bushing 93, both ends of which are connected to a pair of inner link plates 92. A roller 95 is attached so as to surround the rollers 94. The roller 95 has inner and outer peripheries, each having a straight, cylindrical shape. Further, a pair of outer link plates 97 is disposed outside the inner link plates 92, and the outer link plates 97 are connected to each other by a pin 98 that penetrates the bushing 93. Further, the space between the roller 95 and the bushing 93 is filled with a lubricant such as grease or the like. In the roller chain 91, the roller 95 functions as an outer ring of the roller bearing, the rollers 94 function as a rolling body of the roller bearing and the bushing 93 functions as an inner ring of the roller bearing. Therefore, the roller 95, the rollers 94 and the bushing 93 constitute the roller bearing.

Further, as shown in FIG. 17, a substantially ring-shaped retainer 99 is disposed on each of both ends of the roller 95. As shown in FIGS. 19(A) and 19(B), the retainer 99 is substantially ring-shaped. Further, a plurality of pockets 99a, in this embodiment, ten pockets, each having a rectangular shape in plan view is provided on one side of the retainer 99. Each pocket 99a holds and guides an end of a roller 94. Further, the roller chain 91 shown in FIG. 17 includes thrust bearing plates 96 in FIGS. 18(A) and 18(B)). Each thrust bearing plate 96 intervenes between the ends of the roller 95 and retainer 99 and the end of the inner link plate 92. The intervention of this thrust bearing plate 96 increases the contact area, and decreases the contact pressure, when a thrust load is applied to the roller 95. Accordingly, wear of the retainer 99 and thrust bearings receiving plate 96 can be suppressed.

Other features of the roller chain 91 are substantially the same as those of the roller chain 11 shown in FIG. 1, and the operation and effects of the roller chain 91 are also substantially the same as those of the roller chain 11. Thus, further explanation of the roller chain 91 is omitted.

The tenth embodiment of the invention will be described with reference to FIG. 20 and FIGS. 21(A) and 21(B). FIG. 20 is a cross-sectional view of a roller chain incorporating roller bearings according to the tenth embodiment of the invention. FIGS. 21(A) and 21(B) show a retainer used in the roller chain shown in FIG. 20. Particularly, FIG. 21(A) is a cross-sectional view of the retainer and FIG. 21(B) is a plan view thereof. A roller chain 111 shown in FIG. 20 is different from the roller chain 11 shown in FIG. 1 only in that the roller chain 111 in FIG. 20 is one in which the bushing 13 is not used. In other words, the chain 111 is a bushless chain. In the roller chain 111 shown in FIG. 20, a pair of outer link plates 117 is connected to both ends of a pin 118 onto which a pair of inner link plates 112 is fitted. A plurality of rollers 114, for example, ten rollers 114 is disposed on an outer periphery of the pin 118. A roller 115 is attached so as to surround the rollers 114. Further, the space between the roller 115 and the pin 118 is filled with a lubricant such as grease or the like. In the roller chain 111, the roller 115 functions as an outer ring of the roller bearing, the rollers 114 function as a rolling body of the roller bearing and the pin 118 functions as an inner ring of the roller bearing. Therefore, the roller 115, the rollers 114 and the pin 118 constitute the roller bearing.

Further, as shown in FIG. 20, a retainer 119 is disposed on each of both ends of the roller 115. As shown in FIGS. 21(A) and 21(B), the retainer 119 is substantially ring-shaped. Further, a recess portion 119b is formed on one side of each retainer 119, and a plurality of pockets 119a, in this embodiment, ten pockets, each having a continuous semicircular shape in plan view, is formed in the recess portion 119b. Each of the pockets 119a holds and guides an end of a roller 114.

Other features of the roller chain 111 are substantially the same as those of the roller chain 11 shown in FIG. 1, and the operation and effects of the roller chain 111 are also substantially the same as those of the roller chain 11. Thus, further explanation of the roller chain 111 is omitted.

According to the invention, the following effects can be obtained.

(1) Since the rollers can reliably be held and guided by means of the retainer, the roller bearings rotates smoothly, and rolling resistance is thereby reduced.

(2) Since sliding wear between the rollers is not generated, lubrication is unnecessary, and extension of the maintenance period can be realized.

(3) There occurs no contact between the rollers, or metal contact between end faces of the roller and the collar of the outer ring (i.e., the roller), and the machining accuracy of the outer ring is enhanced. Accordingly, low noise performance can be realized.

(4) Since there are no inward collars on both ends of the outer ring (i.e., the roller), machining of the outer ring is very easy, and the outer ring can be produced efficiently. Further, assembly of the rollers is improved, since the retainer has pockets that receives the rollers so that the rollers do not fall out during assembly, and mistakes in counting the rollers are avoided.

(5) The contact area between the retainer and the outer ring and the contact area between the retainer and the inner link plate are increased, and wear therebetween can be suppressed while the skew of the roller can be prevented. Accordingly, performance under a thrust load is improved.

(6) Since the rollers are held and guided by the pockets, vibration in rolling is reduced.

(7) Since a part of each roller is held and guided from both sides by the pocket in the retainer, skew is avoided, and the outer ring rotates straight without snaking. Particularly, in the roller chain incorporating the roller bearings the stick-slip phenomenon and snaking are less likely to occur.

(8) The leak of a lubricant such as grease or the entry of dust from the outside can be prevented, and a uniform and suitable amount of lubricant such as grease or the like can be maintained between rollers for a long period of time. Thus, the use life of the roller bearings is improved.

(9) Since the retainer provided with pockets suitable for the rollers can be easily produced by injection molding, it can be produced inexpensively. Further, since the pockets that hold and guide the roller are separately placed, a particular kind of retainer can be adapted to a roller bearing, even if the length of the roller is varied, and it is not necessary to prepare many kinds of retainers.

Obviously, various minor changes and modifications of the invention are possible in the light of the above teaching. It is therefore to be understood that within the scope of the appended claims, the invention may be practiced otherwise than as specifically described.

What is claimed is:

1. A roller bearing comprising an inner ring and a surrounding outer ring in coaxial, spaced, relationship with each other about an axis of rotation, said outer ring having first and second ends, a plurality of rollers disposed between said outer ring and said inner ring, each roller being cylindrical, having first and second ends, and having a uniform diameter substantially from its first end to its second end, said diameter being equal to the spacing between said inner and outer rings, first and second substantially ring-shaped retainers disposed at the first and second ends of the outer ring respectively, each said retainer being unitary and at least one of the retainers comprising a recess having an axial interior wall and a radial interior wall, the radial wall facing, and being in engagement with, one of the ends of each of said rollers and limiting axial movement of said rollers, and a plurality of pockets formed on said radial interior wall, each said pocket receiving one of said ends of one of the rollers and preventing relative circumferential movement of said parts of the rollers around said axis of rotation.

2. Roller bearings according to claim 1, wherein the retainer is made of metal having wear resistance or resin having lubricating properties.

3. A roller bearing according to claim 1, wherein the shape of each of said pockets is semicircular, circular, oval, polygonal, or an arc conforming to the outer cylindrical surface of the roller received therein.

4. Roller bearings according to claim 1, wherein the pockets formed on both ends of the retainers are asymmetric.

5. Roller bearings according to claim 1, wherein the space between the outer ring and the inner ring is filled with a lubricant.

6. A roller chain comprising a plurality of sprocket-engaging rollers and a plurality of bushings, each bushing being surrounded by, and in coaxial, spaced, relationship with, one of said sprocket-engaging rollers about an axis of rotation, wherein each said sprocket-engaging roller has first and second ends and functions as an outer ring of a roller bearing, and each said bushing functions as an inner ring of a roller bearing, each said roller bearing comprising a plurality of bearing rollers disposed between its outer ring and its inner ring, each bearing roller being cylindrical, having first and second ends, and having a uniform diameter substantially from its first end to its second end, said diameter being equal to the spacing between said inner and outer rings, first and second substantially ring-shaped retainers disposed at the first and second ends of the outer ring respectively, each said retainer being unitary and at least one of the retainers comprising a recess having an axial interior wall and a radial interior wall, the radial wall facing, and being in engagement with, one of the ends of each of said bearing rollers and limiting axial movement of said bearing rollers, and a plurality of pockets formed on said radial interior wall, each said pocket receiving one of said ends of one of the bearing rollers and preventing relative circumferential movement if said parts of the bearing rollers around said axis of rotation.

7. A roller chain according to claim 6, wherein the retainer is made of metal having wear resistance or resin having lubricating properties.

8. A roller chain according to claim 6, wherein the shape of each of said pockets is semicircular, circular, oval, polygonal, or an arc conforming to the outer cylindrical surface of the roller received therein.

9. A roller chain according to claim 6, wherein the pockets formed on both ends of the retainers are asymmetric.

10. A roller chain according to claim 6, wherein the space between the outer ring and the inner ring is filled with a lubricant.

* * * * *

UNITED STATES PATENT AND TRADEMARK OFFICE
CERTIFICATE OF CORRECTION

PATENT NO.    : 6,742,935 B2
DATED         : June 1, 2004
INVENTOR(S)   : Tomoyuki Saji It is certified that error appears in the above-identified patent and that said Letters Patent is hereby corrected as shown below:

<u>Column 7,</u>
Line 41, "12-240072" should read -- 11-240072 --.

Signed and Sealed this

Twenty-ninth Day of November, 2005

JON W. DUDAS
*Director of the United States Patent and Trademark Office*